United States Patent
Gadelrab et al.

(10) Patent No.: US 11,861,467 B2
(45) Date of Patent: Jan. 2, 2024

(54) ADAPTIVE QUANTIZATION FOR EXECUTION OF MACHINE LEARNING MODELS

(71) Applicant: QUALCOMM Incorporated, San Diego, CA (US)

(72) Inventors: Serag Gadelrab, Markham (CA); Karamvir Chatha, San Diego, CA (US); Ofer Rosenberg, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 745 days.

(21) Appl. No.: 16/810,123

(22) Filed: Mar. 5, 2020

(65) Prior Publication Data

US 2021/0279635 A1    Sep. 9, 2021

(51) Int. Cl.
*G06N 20/00* (2019.01)
*G06F 11/34* (2006.01)
*G06N 5/04* (2023.01)

(52) U.S. Cl.
CPC ......... *G06N 20/00* (2019.01); *G06F 11/3466* (2013.01); *G06N 5/04* (2013.01)

(58) Field of Classification Search
None
See application file for complete search history.

(56) References Cited

U.S. PATENT DOCUMENTS

| | | | | |
|---|---|---|---|---|
| 11,222,263 B2* | 1/2022 | Son | ........................ | G06F 7/523 |
| 2016/0379140 A1* | 12/2016 | Abu-Mostafa | ......... | G06N 20/00 703/12 |
| 2017/0270408 A1* | 9/2017 | Shi | ........................ | G06N 3/08 |
| 2018/0197081 A1* | 7/2018 | Ji | ........................ | G06N 3/045 |
| 2018/0341857 A1* | 11/2018 | Lee | ........................ | G06N 3/08 |
| 2019/0012559 A1* | 1/2019 | Desappan | ................. | G06N 3/08 |
| 2019/0050710 A1* | 2/2019 | Wang | ....................... | G06N 3/04 |
| 2019/0050733 A1* | 2/2019 | Bopardikar | ............ | G06N 3/082 |

(Continued)

OTHER PUBLICATIONS

International Search Report and Written Opinion—PCT/US2021/020925—ISA/EPO—dated Jun. 18, 2021.

(Continued)

*Primary Examiner* — Gregory B Sefcheck
*Assistant Examiner* — Suk Jin Kang
(74) *Attorney, Agent, or Firm* — Patterson + Sheridan LLP

(57) ABSTRACT

Certain aspects of the present disclosure provide techniques for adaptively executing machine learning models on a computing device. An example method generally includes receiving weight information for a machine learning model to be executed on a computing device. The received weight information is reduced into quantized weight information having a reduced bit size relative to the received weight information. First inferences using the machine learning model and the received weight information, and second inferences are performed using the machine learning model and the quantized weight information. Results of the first and second inferences are compared, it is determined that results of the second inferences are within a threshold performance level of results of the first inferences, and based on the determination, one or more subsequent inferences are performed using the machine learning model and the quantized weight information.

42 Claims, 8 Drawing Sheets

(56) References Cited

U.S. PATENT DOCUMENTS

| | | | |
|---|---|---|---|
| 2019/0258932 A1* | 8/2019 | Kang | G06N 3/0454 |
| 2019/0340499 A1* | 11/2019 | Burger | G06N 3/063 |
| 2020/0082269 A1* | 3/2020 | Gao | G06N 3/0454 |
| 2020/0125947 A1* | 4/2020 | Park | G06N 3/08 |
| 2020/0257960 A1* | 8/2020 | Gabriel | G06N 3/08 |
| 2020/0257986 A1* | 8/2020 | Diamantopoulos | G06N 3/063 |
| 2020/0302269 A1* | 9/2020 | Ovtcharov | G06N 3/084 |
| 2021/0019616 A1* | 1/2021 | Chen | G06N 7/046 |
| 2021/0056423 A1* | 2/2021 | Na | G06N 3/084 |
| 2021/0065052 A1* | 3/2021 | Muralidharan | G06N 3/082 |
| 2021/0073635 A1* | 3/2021 | Sasagawa | G06K 9/6286 |
| 2021/0081789 A1* | 3/2021 | Chai | G06F 16/9024 |
| 2021/0150248 A1* | 5/2021 | Desappan | G06K 9/6273 |
| 2021/0218414 A1* | 7/2021 | Malhotra | G06N 5/046 |
| 2021/0248463 A1* | 8/2021 | Sasagawa | G06N 3/063 |
| 2021/0264232 A1* | 8/2021 | Kim | G06N 3/048 |
| 2021/0350210 A1* | 11/2021 | Gong | G06F 17/16 |
| 2022/0036155 A1* | 2/2022 | Guevara | G06N 3/0454 |
| 2022/0067527 A1* | 3/2022 | Xu | G06N 3/0454 |
| 2022/0108178 A1* | 4/2022 | Lee | G06N 3/084 |
| 2022/0114455 A1* | 4/2022 | Samek | G06K 9/6223 |
| 2022/0129759 A1* | 4/2022 | Yao | G06N 3/084 |
| 2022/0138529 A1* | 5/2022 | Kim | G06N 3/04 706/31 |
| 2022/0138576 A1* | 5/2022 | Son | G06N 3/08 706/25 |
| 2022/0269941 A1* | 8/2022 | Ji | G06N 3/045 |
| 2023/0085442 A1* | 3/2023 | Yu | G06N 3/08 |

OTHER PUBLICATIONS

Kluska P., et al., "Post-Training Quantization Methods for Deep Learning Models", Mar. 4, 2020 (Mar. 4, 2020), Advances in Intelligent Data Analysis XIX; [Lecture Notes in Computer Science; Lect.Notes Computer], Springer International Publishing, CHAM, pp. 467-479, XP047545604, ISSN: 0302-9743 ISBN: 978-3-030-71592-2 [retrieved on Mar. 4, 2020] sections 1 and 3.3 table 4 and 5.

Krishnamoorthi R., "Quantizing Deep Convolutional Networks for Efficient Inference: A Whitepaper", arxiv.org, Cornell University Library, 201 Olin Library Cornell University Ithaca, NY 14853, Jun. 21, 2018 (Jun. 21, 2018), XP080893243, pp. 1-36, section 3.1.

Yousefzadeh A., et al., "Asynchronous Spiking Neurons, the Natural Key to Exploit Temporal Sparsity", IEEE Journal on Emerging and Selected Topics in Circuits and Systems, IEEE, Piscataway, NJ, USA, vol. 9, No. 4, Dec. 1, 2019 (Dec. 1, 2019), pp. 668-678, XP011759578, ISSN: 2156-3357, DOI: 10.1109/JETCAS.2019.2951121 [retrieved on Dec. 10, 2019] sections III.B and IV.

Zhang D., et al., "LQ-Nets: Learned Quantization for Highly Accurate and Compact Deep Neural Networks", European Conference on Computer Vision, LNCS, vol. 11212, 2018, pp. 373-390.

* cited by examiner

ADAPTIVE QUANTIZATION FOR EXECUTION OF MACHINE LEARNING MODELS

INTRODUCTION

Aspects of the present disclosure relate to optimizing machine learning model performance on computing devices.

Machine learning generally produces a trained model (e.g., an artificial neural network, a tree, or other structures), which represents a generalized fit to a set of training data that is known a priori. Applying the trained model to new data produces inferences, which may be used to gain insight into the new data. In some cases, applying the model to the new data is described as "running an inference" on the new data.

Trained models may be generated using high-precision floating point numbers (e.g., 16-bit half precision floating point numbers, 32-bit single precision floating point numbers, 64-bit double precision floating point numbers, etc.). The use of higher-precision floating point numbers in a machine learning model (sometimes referred to as a "high accuracy model") may provide higher accuracy when an inference is run on new data relative to the use of lower-precision floating point numbers or integers in a machine learning model (sometimes referred to as a "high efficiency model"); however, the use of these higher-precision floating point numbers may not be power efficient.

In a computing device with multiple processors (e.g., central processing units, graphics processing units, digital signal processors, neural processing units, custom hardware, field programmable gate arrays, etc.), each of these processors may have different power usage and performance characteristics. Processors that can perform processing on higher-precision floating point numbers and can thus execute inferences using a high accuracy model may have higher power consumption than processors that are optimized for performing operations using lower-precision floating point numbers or integers and can thus execute inferences using high efficiency models. Thus, the use of processors that can execute inferences using a high accuracy model may reduce the battery life of a mobile computing device, such as a phone or tablet, relative to the use of processors that are optimized for executing inferences using high efficiency models.

Accordingly, what are needed are systems and methods for adapting machine learning model parameters for different processing units to reduce power consumption during inference operations while generating inference results with sufficient accuracy.

BRIEF SUMMARY

Embodiments of the present disclosure provide a method for adaptively executing machine learning models on a computing device. The method generally includes receiving weight information for a machine learning model to be executed on a computing device. The received weight information is reduced into quantized weight information having a reduced bit size relative to the received weight information. First inferences are performed using the machine learning model and the received weight information, and second inferences are performed using the machine learning model and the quantized weight information. The results of the first inferences and the second inferences are compared, and it is determined that that the results of the second inferences are within a threshold performance level of results of the first inferences. Based on determining that results of the second inferences are within a threshold performance level of results of the first inferences, one or more subsequent inferences are performed using the machine learning model and the quantized weight information.

Further embodiments of the present disclosure provide a system having a processor and a memory. The memory generally includes instructions stored thereon which, when executed by the processor, performs an operation for adaptively executing machine learning models on a computing device. The operation generally includes receiving weight information for a machine learning model to be executed on a computing device. The received weight information is reduced into quantized weight information having a reduced bit size relative to the received weight information. First inferences are performed using the machine learning model and the received weight information, and second inferences are performed using the machine learning model and the quantized weight information. The results of the first inferences and the second inferences are compared, and it is determined that that the results of the second inferences are within a threshold performance level of results of the first inferences. Based on determining that results of the second inferences are within a threshold performance level of results of the first inferences, one or more subsequent inferences are performed using the machine learning model and the quantized weight information.

Still further embodiments of the present disclosure provide a computer-readable medium having instructions stored thereon which, when executed by a processor, performs an operation for adaptively executing machine learning models on a computing device. The operation generally includes receiving weight information for a machine learning model to be executed on a computing device. The received weight information is reduced into quantized weight information having a reduced bit size relative to the received weight information. First inferences are performed using the machine learning model and the received weight information, and second inferences are performed using the machine learning model and the quantized weight information. The results of the first inferences and the second inferences are compared, and it is determined that that the results of the second inferences are within a threshold performance level of results of the first inferences. Based on determining that results of the second inferences are within a threshold performance level of results of the first inferences, one or more subsequent inferences are performed using the model and the quantized weight information.

Further embodiments relate to apparatuses configured to perform the methods described herein as well as non-transitory computer-readable mediums comprising computer-executable instructions that, when executed by a processor of a device, cause the device to perform the methods described herein.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Aspects of the present disclosure provide apparatuses, methods, processing systems, and computer readable mediums for optimizing the performance of machine learning models, such as neural networks, in hardware.

With reference now to the figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Example System-on-a-Chip

Figure 1:
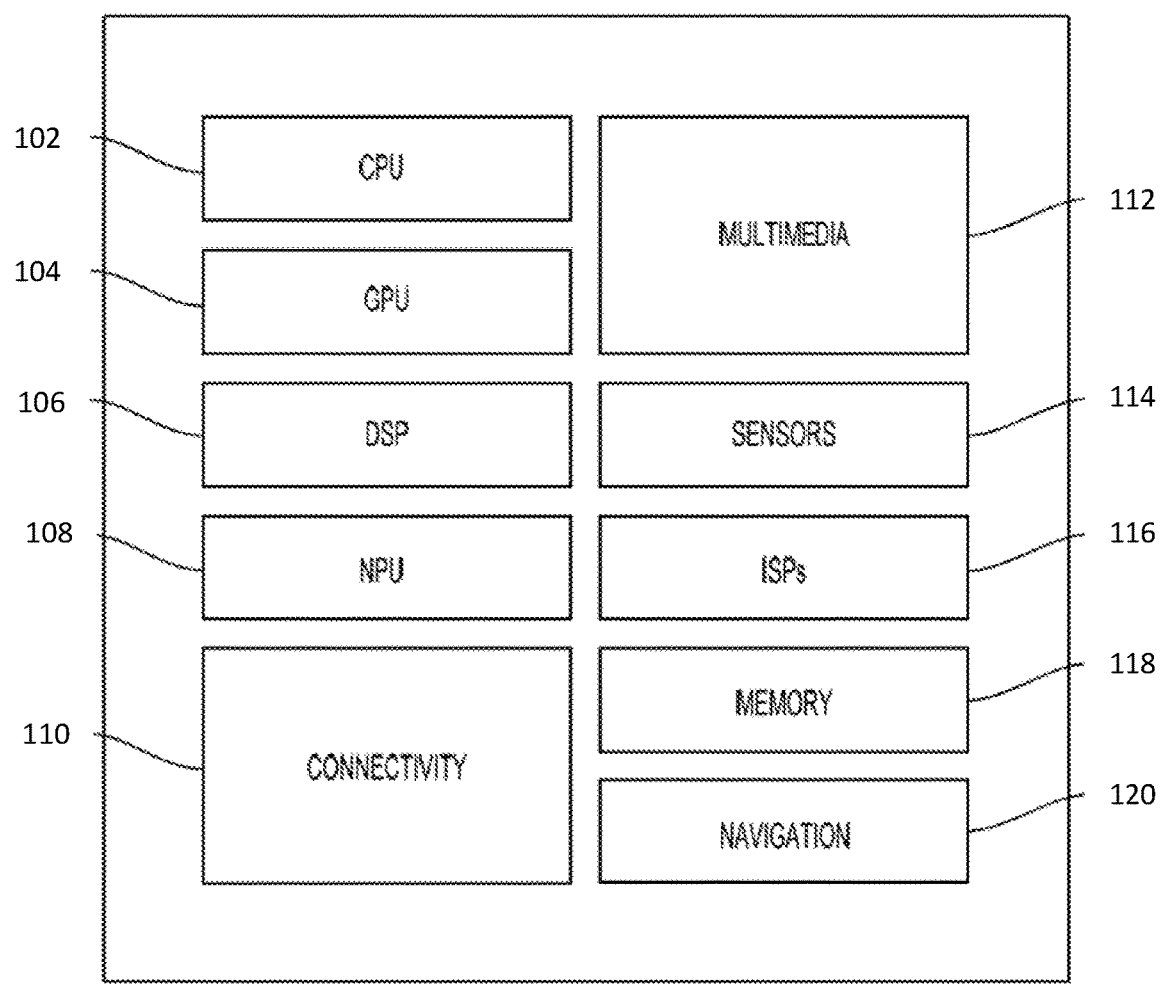
FIG. 1 illustrates an example implementation of a system-on-a-chip (SOC).

FIG. 1 illustrates an example implementation of a system-on-a-chip (SOC) 100, which may include a central processing unit (CPU) 102 or a multi-core CPU configured to adaptively quantize weights and parameters for machine learning models. The SOC may further be configured to activate and deactivate performance of inferences on input data using a high efficiency quantized model, according to embodiments described herein. Quantized weights and activation parameters associated with each of a plurality of high efficiency quantized models may be stored in a memory block associated with a neural processing unit (NPU) 108, in a memory block associated with a CPU 102, in a memory block associated with a graphics processing unit (GPU) 104, in a memory block associated with a digital signal processor (DSP) 106, in a memory block 118, or may be distributed across multiple blocks. Instructions executed at the CPU 102 may be loaded from a program memory associated with the CPU 102 or may be loaded from a memory block 118.

The SOC 100 may also include additional processing blocks tailored to specific functions, such as a GPU 104, a DSP 106, a connectivity block 110, which may include fifth generation (5G) connectivity, fourth generation long term evolution (4G LTE) connectivity, Wi-Fi connectivity, USB connectivity, Bluetooth connectivity, and the like, and a multimedia processor 112 that may, for example, detect and recognize gestures. In one implementation, the NPU is implemented in the CPU 102, DSP 106, and/or GPU 104. The SOC 100 may also include a sensor processor 114, image signal processors (ISPs) 116, and/or navigation module 120, which may include a global positioning system.

The SOC 100 may be based on an ARM instruction set. In an aspect of the present disclosure, the instructions loaded into the CPU 102 may comprise code to perform inferences using a machine learning model and concurrently optimize operational parameters (e.g., weights, biases, activation parameters, etc.) for the machine learning model.

SOC 100 and/or components thereof may be configured to perform the methods described herein.

Deep Neural Networks and Deep Learning

Deep learning architectures may perform complex tasks, such as object recognition, by learning to represent inputs at successively higher levels of abstraction in each layer, thereby building up a useful feature representation of the input data. In this way, deep learning addresses a major bottleneck of traditional machine learning.

Prior to the advent of deep learning, a machine learning approach for a task may have relied heavily on human engineered features, perhaps in combination with a shallow classifier. A shallow classifier may be a two-class linear classifier, for example, in which a weighted sum of input values (e.g., input vector components) may be compared with a threshold to predict to which class the input belongs. Human engineered features may be templates or kernels tailored to a specific problem domain by engineers with domain expertise. Deep learning architectures, in contrast, may learn to represent features that are similar to what a human engineer might design, but through training. Furthermore, a deep network may learn to represent and recognize new types of features that a human might not have considered.

In some implementations, a deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. Further layers may learn to represent complex shapes in visual data or words in auditory data. Still further layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. For example, in feed-forward networks, information is passed from lower to higher layers, with each neuron in a given layer communicating to neurons in higher layers. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

The connections between layers of a neural network may be fully connected or locally connected. In a fully connected neural network, a neuron in a first layer may communicate its output to every neuron in a second layer, so that each neuron in the second layer will receive input from every neuron in the first layer.

In a locally connected neural network, a neuron in a first layer may be connected to a limited number of neurons in the second layer. More generally, a locally connected layer of the locally connected neural network may be configured so that each neuron in a layer will have the same or a similar connectivity pattern, but with connections strengths that may have different values. The locally connected connectivity pattern may give rise to spatially distinct receptive fields in a higher layer, because the higher layer neurons in a given region may receive inputs that are tuned through training to the properties of a restricted portion of the total input to the network.

One example of a locally connected neural network is a convolutional neural network. The convolutional neural network may be configured such that the connection strengths associated with the inputs for each neuron in the second layer are shared. Convolutional neural networks may be well suited to problems in which the spatial location of inputs is meaningful.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer, with each element of the feature map receiving input from a range of neurons in the previous layer and from each of the multiple channels. The values in the feature map may be further processed with a non-linearity, such as a rectification, max(0,x). Values from adjacent neurons may be further pooled, which corresponds to down sampling, and may provide additional local invariance and dimensionality reduction.

One type of convolutional neural network is a deep convolutional network (DCN). Deep convolutional networks (DCNs) are networks of convolutional layers, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

In some embodiments, a DCN may be designed to recognize visual features from an image input from an image capturing device 130, such as a car-mounted camera. The DCN of the current example may be trained to identify traffic signs and a number provided on the traffic sign. Of course, the DCN may be trained for other tasks, such as identifying lane markings or identifying traffic lights. These are just some example tasks, and many others are possible.

DCN may be trained with supervised learning. During training, the DCN may be presented with an image, such as a speed limit sign, and a forward pass may then be computed to produce an output. DCN may include a feature extraction section and a classification section. Upon receiving the image, a convolutional layer may apply convolutional kernels (not shown) to the image to generate a first set of feature maps. As an example, the convolutional kernel for the convolutional layer may be a 5×5 kernel that generates 28×28 feature maps. The number of convolutional kernels applied to an image may be correlated to a number of feature maps generated in the first set of feature maps. For example, where four different feature maps are generated in the first set of feature maps, four different convolutional kernels may be applied to the image at the convolutional layer. The convolutional kernels may also be referred to as filters or convolutional filters.

A first set of feature maps may be subsampled by a max pooling layer to generate a second set of feature maps. The max pooling layer reduces the size of the first set of feature maps. That is, a size of the second set of feature maps, such as 14×14, is less than the size of the first set of feature maps, such as 28×28. The reduced size provides similar information to a subsequent layer while reducing memory consumption. The second set of feature maps may be further convolved via one or more subsequent convolutional layers to generate one or more subsequent sets of feature maps.

Feature maps in a DCN may be convolved to generate one or more feature vectors. Each feature of the feature vector may correspond to a possible feature of an image, and a softmax function generate a probability for each feature. As such, the output of the DCN may thus be a probability that the input image includes one or more features. Before training, the output produced by the DCN is likely to be incorrect. Thus, an error may be calculated between the output produced by the DCN and a target output. The target output is the ground truth of the image. The weights of the DCN may then be adjusted so the output of the DCN is more closely aligned with the target output.

To adjust the weights, a learning algorithm may compute a gradient vector for the weights. The gradient may indicate an amount that an error would increase or decrease if the weight were adjusted. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level. After learning, DCN 100 may be presented with new images and a forward pass through the network may yield an output 122 that may be considered an inference or a prediction of the DCN.

Finally, deep belief networks (DBNs) are probabilistic models comprising multiple layers of hidden nodes. DBNs may be used to extract a hierarchical representation of training data sets. A DBN may be obtained by stacking up layers of Restricted Boltzmann Machines (RBMs). An RBM is a type of artificial neural network that can learn a probability distribution over a set of inputs. Because RBMs can learn a probability distribution in the absence of information about the class to which each input should be categorized, RBMs are often used in unsupervised learning. Using a hybrid unsupervised and supervised paradigm, the bottom RBMs of a DBN may be trained in an unsupervised manner and may serve as feature extractors, and the top RBM may be trained in a supervised manner (on a joint distribution of inputs from the previous layer and target classes) and may serve as a classifier.

The deep learning architectures discussed above generally may be trained using a training data set. The resulting model generated during training may be defined as a neural network with high precision floating point weights, such as 32-bit single precision floating point numbers or 64-bit double precision floating point numbers.

Adaptive Quantization for Efficient Execution of Machine Learning Models

Computer systems may perform operations on various numerical types of data. These data types may include integers and floating point numbers. Integers are generally whole numbers that may be represented by any sequence of bits, with a maximum and minimum value defined by a number of bits in the representation and whether the integer is signed or unsigned. Generally, the maximum value of an unsigned integer may be calculated as $2^N-1$ for any bit size n. The minimum value of a signed integer may be calculated as $-2^{N-1}$, and the maximum value of a signed integer may be calculated as $2^{n-1}$ for any bit size n. For example, an 8-bit integer may range in value from 0 to 255 in an unsigned representation and from −128 to 127 in a signed representation. As the number of bits increases, the number of possible values increases. Floating point numbers, however, are represented in a more complex manner. Typically, floating point numbers are defined in terms of a bit reserved for a sign (positive or negative), a number of exponent bits, and a number of precision bits.

Because integer and floating point numbers are represented differently, mathematical operations may involve different levels of computational expense based on whether a mathematical operation is operating on integers or floating point numbers. For example, addition of two integers may be a trivial bitwise operation in which each bit is combined and overflow is carried to the next bit. However, floating point operations may be more complex, as multiple operations may be performed to combine the exponent and precision bits, and a multiplication operation may be performed based on the exponent and precision bits to generate a result. Thus, integer-based logic may be implemented on simpler, more power efficient hardware than floating-point based logic.

Many types of computational hardware blocks may be used to run an inference, including, for example: a central processing unit (CPU), a graphics processing unit (GPU), a digital signal processor (DSP), a neural processing unit (NPU), a field programmable gate array (FPGA), an application specific integrated circuit (ASIC), and other custom hardware. To improve the efficiency of inference performance using these computational hardware blocks, model parameters, such as model weights, may be quantized and reduced in size from a number n bits to a smaller number of bits and/or from floating point to integer representations.

For example, weights may be quantized for each layer in a machine learning model by finding a distribution of the weights and the maximum and minimum value of the weights in a floating point representation of the machine learning model, and weights may be mapped to an integer space (e.g., 64-bit long integer, 32-bit integer, 16-bit short integer) using the maximum and minimum value of the weights to account for the reduced dynamic range of the integer space. Quantization of weights to data types represented by fewer bits (e.g., quantizing a double precision floating point number to a single precision floating point number) may provide for acceptable inference performance; however, if the dynamic range of the floating point weights is high and weights are not clustered, the network may need to be retrained.

Inside integer-based inference engines used to generate an inference representing some predicted data from a given input value, activation statistics tracking when neurons in a neural network are activated may be accumulated in high dynamic range registers (e.g., registers that can accommodate 32 bit integers or higher bit-size integers). When processing of layers in the neural network is completed, the activation statistics stored in these registers may be quantized to a smaller representation (e.g., 8-bit integers or 16-bit integers) and written to memory, such as on-chip static random access memory (SRAM) or dynamic random access memory (DRAM). To quantize accumulated activation statistics, a sample of representative inputs may be provided a priori, and the machine learning model may be executed to identify the maximum and minimum values for parameters in each layer of the machine learning model. The activation statistics may be quantized to an n-bit value for an activation parameter x according to the equation:

$$x_{quantized} = \left[ \frac{x_{register} - x_{min}}{x_{max} - x_{min}} * 2^n \right]$$

While quantizing activation statistics may also allow for execution of inferences using smaller data types, situations may exist where the value of an activation register overflows or underflows the quantization parameter. For example, an unsigned 8-bit register may accumulate beyond $2^8-1=255$, thus rolling the register's value over to 0, or decrement below 0, thus rolling the register value back to 255, which results in poor inference accuracy.

Developers generally do not quantize weights or biases in machine learning models prior to deployment, thus deploying a machine learning model with large floating point weights. These models may be executed using high performance, high power consumption hardware (e.g., "big" compute cores in a heterogeneous multicore processor, graphics processing units, etc.), even when inferences could be performed with sufficient accuracy using smaller data representations and less power-hungry hardware (e.g., "small" compute cores in a heterogeneous multicore processor). Where models are quantized, the quantization may be tested with some inputs to verify that the quantized model works for those outputs; however, real-life inputs may result in inaccurate or failed inferences. Further, because processing cores that support large floating point numbers (sometimes referred to as "high performance cores") may have a larger size than processing cores that are provisioned for performing tasks efficiently (e.g., NPUs, DSPs, accelerators) or processing cores that support only integer (fixed point) operations (sometimes referred to as "efficient cores"), processors may be designed with a smaller number of high performance cores than efficient cores.

To allow for inferences to be performed on efficient cores while maintaining a sufficient degree of accuracy in the results generated by executing inferences using a quantized machine learning model, embodiments described herein provide various techniques for adaptively quantizing parameters used by a machine learning model and switching between performing inferences using a high accuracy model on high performance cores and performing inferences using quantized models on efficient cores.

Generally, execution of inferences may begin using a high accuracy model on high performance cores (e.g., using a machine learning model with floating point weights), and inferences may be performed in parallel on one or more high efficiency cores using one or more sets of quantized weights (e.g., weights quantized to reduced-size representations, such as 16-bit integer, to 8-bit integer, 4-bit integer, etc., relative to the floating point weights included in a high accuracy model) until a system is confident that one of the models executing with quantized weights (i.e., one of the high efficiency models) is able to generate sufficiently accurate inferences relative to the inferences generated by the high accuracy model. Likewise, while generating inferences using a high efficiency model, inferences can be periodically generated using the high accuracy model to refine parameter quantization and to determine whether to re-quantize the model. By quantizing machine learning parameters and continually optimizing the quantized weights, embodiments described herein allow for the generation of accurate inferences using efficient cores for models that are generated using higher accuracy data types (e.g., 32-bit single precision floating point or 64-bit double precision floating point). Using efficient cores and quantized weights to perform inferences may allow for power savings relative to using high-performance cores and machine learning models with floating point weights, which may provide for improved battery life on battery-powered devices on which inferences are executed, reduced power usage and heat generation by devices on which inferences are executed, and the like. Further, embodiments described herein allow for re-quantization of parameters for high efficiency models as operating conditions change (e.g., as inferences decrease in accuracy or as the data on which an inference is to be performed changes).

Figure 2:
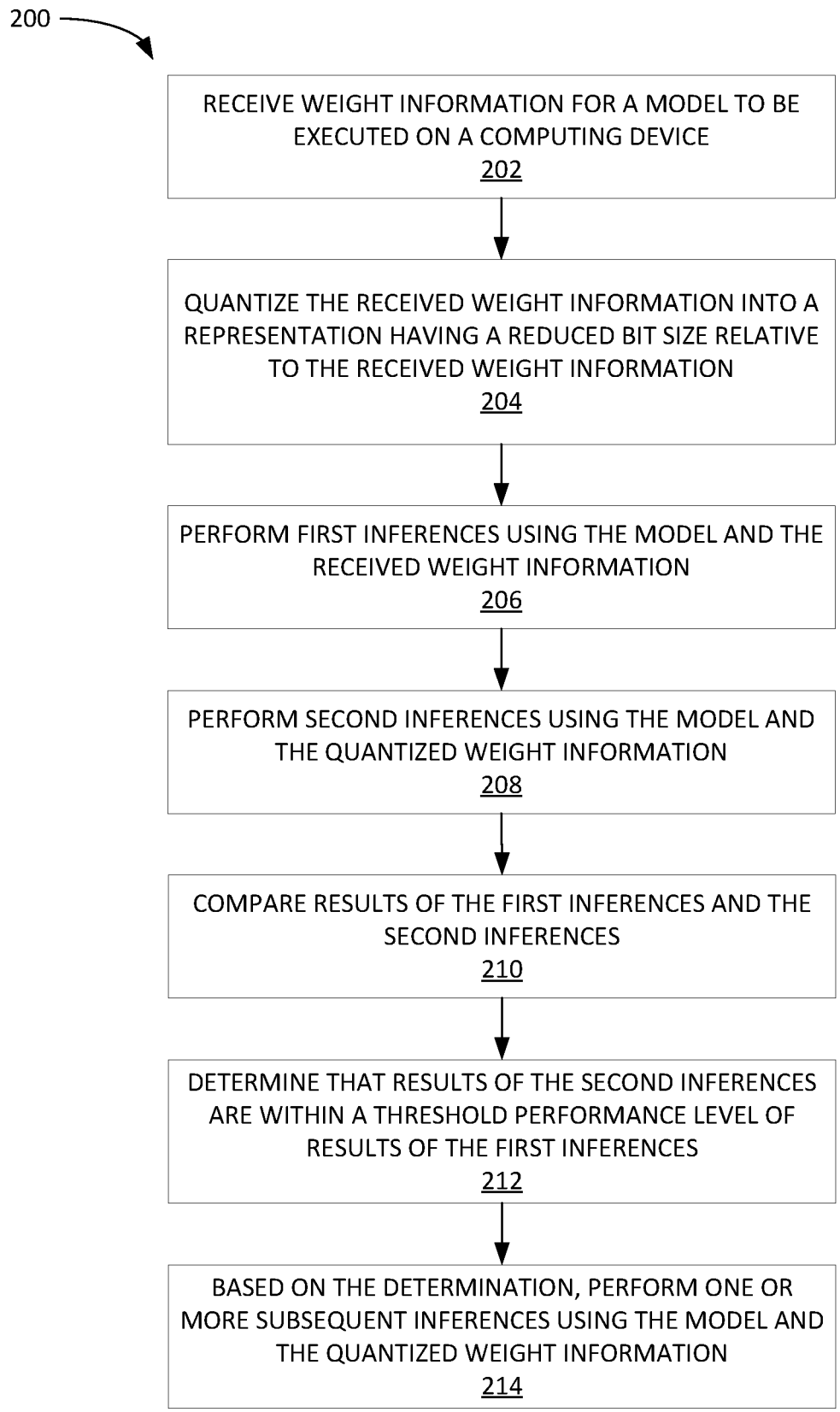
FIG. 2 illustrates example operations for performing inferences using a trained machine learning model and quantizing weights used for execution of the trained machine learning model on higher efficiency hardware, according to embodiments described herein.

FIG. 2 illustrates example operations 200 for performing inferences using adaptively quantized machine learning models, according to embodiments described herein. Generally, adaptively quantizing machine learning models may allow for adaptively executing inferences on a computing device. Operations 200 may be performed by a computing device with one or more processors (e.g., CPU, DSP, GPU, etc.) implementing a machine learning model, such as described with respect to FIG. 8, below.

As illustrated, operations 200 begin at block 202, where the computing device receives weight information for a machine learning model to be executed on the computing device. The received weight information for the machine learning model may be high-precision information, such as 32-bit floating point or 64-bit floating point numbers, that may be generated during training of the machine learning model. This model may be designated as a "high accuracy" model which can be used, as discussed in further detail below, to determine whether inferences generated using a quantized model have an accuracy within a threshold amount relative to inferences generated using the high accuracy model.

At block 204, the computing device quantizes the received weight information into a representation having a reduced bit size relative to the received weight information. The representation having a reduced bit size relative to the received weight information may be referred to as quantized weight information. The quantized weight information may be in a format for which computation is less intensive than computation using the received weight information. For example, where the received weight information is in a high-precision data type (e.g., 32-bit single precision floating point or 64-bit double precision floating point), the quantized weight information may be in smaller floating point numbers (e.g., 16-bit half precision floating point) or in integers (e.g., 32-bit long integer, 16-bit short integer, etc.).

In some embodiments, the computing device can reduce the weight information into a plurality of sets of quantized weight information associated with different quantization levels to be tested during execution of the machine learning model to identify an optimal level of quantization, or a level of quantization that results in sufficient inference accuracy relative to inference accuracy for inferences performed using the high accuracy model.

In some embodiments, the computing device can reduce the weight information by quantizing the weight information to a first bit size and determine, as discussed below, whether inferences performed using the quantized weight information at the first bit size is sufficiently accurate relative to inference accuracy for inferences performed using the high accuracy model. If the accuracy of inferences performed using the quantized weight information at the first bit size is sufficiently accurate, the computing device can reduce the weight information to a second quantization level that is lower than the first quantization level (e.g., quantizing floating point data into an 8-bit fixed point representation, if the first quantization level quantized floating point data into a 16-bit fixed point representation) and continually reduce the weight information to lower quantization levels until inferences are no longer sufficiently accurate relative to inference accuracy for inferences performed using the high accuracy model.

In another embodiment, the computing device can quantize weight information from floating point to a minimal bit size representation (e.g., 1-bit or 2-bit integer) and determine if inferences performed using the minimal bit size representation has sufficient accuracy relative to inference accuracy for inferences performed using the high accuracy model. If inferences performed using the minimal bit size representation are not sufficiently accurate, the computing device can quantize weight information from floating point to successively larger integer quantization levels until the accuracy of inferences performed using quantized weight information is sufficiently accurate relative to inference accuracy for inferences performed using the high accuracy model.

At block 206, the computing device performs first inferences using the model and the received weight information.

In some embodiments, when the computing device performs first inferences using the model and the received weight information (e.g., performs first inferences using the high accuracy model), the computing device can determine statistics on the dynamic range of various activation statistics for each activation layer in a machine learning model. The dynamic range may be maximum and minimum values at each activation layer in the machine learning model that can be used, as discussed above, to reduce the weight information into quantized weight information and quantize other parameters for the machine learning model.

At block 208, the computing device performs second inferences using the model and the quantized weight information.

At block 210, the computing device compares the results of the first inferences and the second inferences. Generally, in comparing the results of the first and the second inferences, the computing device can treat the results of the first inferences as "ground truth" data and determine whether the second inferences are within a threshold accuracy level of the first inferences. To compare the results of the first inferences and the second inferences, the computing device may examine overflow/underflow statistics for each inference performed using the high efficiency (quantized) machine learning model to determine whether the overflow/underflow statistics for quantized data are within an acceptable range. This range may, in some embodiments, be a pre-defined range set by a developer of a machine learning model or by the computing device for generating quantized weights and activation statistics for a machine learning model. The computing device can also examine the accuracy of each of the second inferences relative to the corresponding first inferences to determine whether the high efficiency model used to generate the second inferences can generate sufficiently accurate inferences relative to the high accuracy model used to generate the first inferences.

At block 212, the computing device determines that the results of the second inferences are within a threshold performance level of results of the first inferences.

At block 214, based on the determination, the computing device performs one or more subsequent inferences using the model and the quantized weight information.

In some embodiments, the received weight information may comprise a floating point representation of weights in the model. The quantized weight information may comprise an integer approximation of the floating point representation of the weights in the model.

In some embodiments, the quantized weight information may comprise a plurality of weight sets, each weight set having a different bit size. Performing the second inferences may entail performing an inference using the model and each of the plurality of weight sets. The computing device can determine that results of the second inference are within the threshold performance level of results of the first inference by identifying a weight set of the plurality of weight sets with a result having a performance closest to the threshold performance level and returning the result associated with the identified weight set as the result of the second inference. While executing inferences using a high accuracy model and multiple high efficiency models may use more power than executing inferences using a high accuracy model, the computing device may execute inferences using the high accuracy model and multiple high efficiency models for a limited amount of time prior to selecting one of the multiple high efficiency models for future use. After the one of the multiple high efficiency models is selected, power usage for inferences performed on the computing device may decrease to a level below the power usage for inferences performed using the high accuracy model and may remain below the power usage for inferences performed using the high accuracy model until the computing device resumes performing inferences using the high accuracy model.

In some embodiments, performing the one or more subsequent inferences using the model and the quantized weight information comprises performing the one or more subsequent inferences using the identified weight set of the plurality of weight sets.

In some embodiments, the quantized weight information comprises first quantized weights having a predefined bit size. The computing device can generate second quantized weights having a smaller bit size than the quantized weight information and perform a subset of the one or more subsequent inferences using the second quantized weights. The computing device can determine that results of the subset of the one or more subsequent inferences using the second quantized weights are within the threshold performance level of results of the subset of the one or more subsequent inferences using the model and the quantized weight information. Based on determining that the results of the subset of the one or more subsequent inferences using the second quantized weights are within the threshold performance level, the computing system can perform additional inferences beyond the one or more subsequent inferences using the model and the second quantized weight information.

In some embodiments, while performing the second inference using the model and the first quantized weights, the computing device can generate second quantized weights from quantizing the received weight information, the second quantized weights having a larger bit size than the first quantized weights. The computing device can determine that results of the second inference using the model and the quantized weight information are not within the threshold performance level of the results of the first inference for a threshold number of inferences and, based on the determination, perform additional inferences using the second quantized weights.

In some embodiments, the performance level comprises an accuracy difference relative to the first inference and a size of overflow or underflow relative to a supported range of values for each layer in the model, given a bit size of the quantized weight information.

In some embodiments, the computing device may adjust the threshold performance level based on an amount of difference between a current input and a previous input for which inferences are to be performed using the model. An accuracy difference threshold may be increased as differences between a current input and a previous input increase and may be decreased as the current input and previous input converge. For example, in a case where successive video frames include the same actors and a consistent motion vector, an accuracy difference threshold may be decreased, as the model may be expected to converge on similar inference results for similar inputs over time. Correspondingly, in a case where successive video frames increase new actors or change a motion vector of one of the actors, an accuracy difference threshold may be increased to account for uncertainty in the inferences generated from the new actors or changed motion vector.

In some embodiments, the computing device determines that a difference between a current input and a previous input for which inferences are to be performed using the model exceeds a threshold amount of change. Based on the determination, the computing device can perform inferences on the current input and one or more additional inferences using the model and the received weight information.

In some embodiments, the computing device performs inferences for a subset of the one or more subsequent inferences using the model and the received weight information and determines that results of the subset of the one or more subsequent inferences using the model and the quantized weight information are outside the threshold performance level (e.g., has lower accuracy and/or higher overflow/underflow statistics) relative to results of the subset of the one or more subsequent inferences using the model and the received weight information. Based on the determination that the results of the subset of the one or more subsequent inferences are outside the threshold performance level, the computing device performs additional inferences using the model and the received weight information.

In some embodiments, the computing device can refine the quantized weight information based on results of the one or more subsequent inferences executed using the model and the quantized weight information, the refined quantized weight information comprising ranges of values to use in performing inferences using the model and the refined quantized weight information.

In some embodiments, each inference of the second inferences is performed according to a periodicity defining a number of first inferences to be performed prior to performing one of the second inferences.

In some embodiments, a subset of the one or more subsequent inferences are also performed using the received weight information. The subset of the one or more inferences may be a periodic sampling of the one or more subsequent inferences, and the periodicity of the periodic sampling may be determined from a performance difference between results of the subset of the one or more subsequent inferences performed using the received weight information and results of the subset of the one or more subsequent inferences performed using the quantized weight information.

In some embodiments, the computing device saves the quantized weight information prior to halting inference performance using the model and the received weight information. The quantized weight information may be saved, for example, when the computing device transitions from a high accuracy mode to a high efficiency mode. When the computing system re-enters a high efficiency mode, the computing system can resume performance of inferences using the model and the saved quantized weight information without regenerating the quantized weight information.

In some embodiments, the quantized weight information may comprise individual quantized weights for each activation layer in the model. Quantized weights for a respective layer in the model may have a bit size independent of a bit size of quantized weights for other layers in the model.

In some embodiments, the computing device performs inferences using the received weight information on a first set of processing cores in a multicore processor and performs inferences using the quantized weight information on a second set of cores in the multicore processor.

In some embodiments, the first inferences and the second inferences are performed in parallel across different processing cores in a multicore processor.

In some embodiments, the first inferences are performed on a first type of processor; and the second inferences are performed on a second type of processor. In some embodiments, the first type of processor may be high-performance processors or processing cores in a multicore processor, and the second type of processor may be high-efficiency processors or processing cores in a multicore processor. Generally, by performing inferences on the second type of processor using quantized weight information, power savings can be realized relative to performance of inferences on the first type of processor using the received weight information. These power savings may, for example, provide for improved battery life for mobile devices on which inferences are performed, reduced power usage and heat generation by computing devices on which inferences are performed, and the like.

In some embodiments, the first inferences are performed on a first set of processing cores in a heterogeneous multicore processor, and the second inferences are performed on a second set of processing cores in the heterogeneous multicore processor.

In some embodiments, a delay factor, or hysteresis, may be used to control when a computing device performs the one or more subsequent inferences using the model and the quantized weight information. The delay factor may be set such that a number of inferences are to be performed using both the high accuracy and the high efficiency models to verify that the high efficiency model is consistently generating inferences that are sufficiently accurate and with overflow/underflow statistics that are below an acceptable level.

Figure 3:
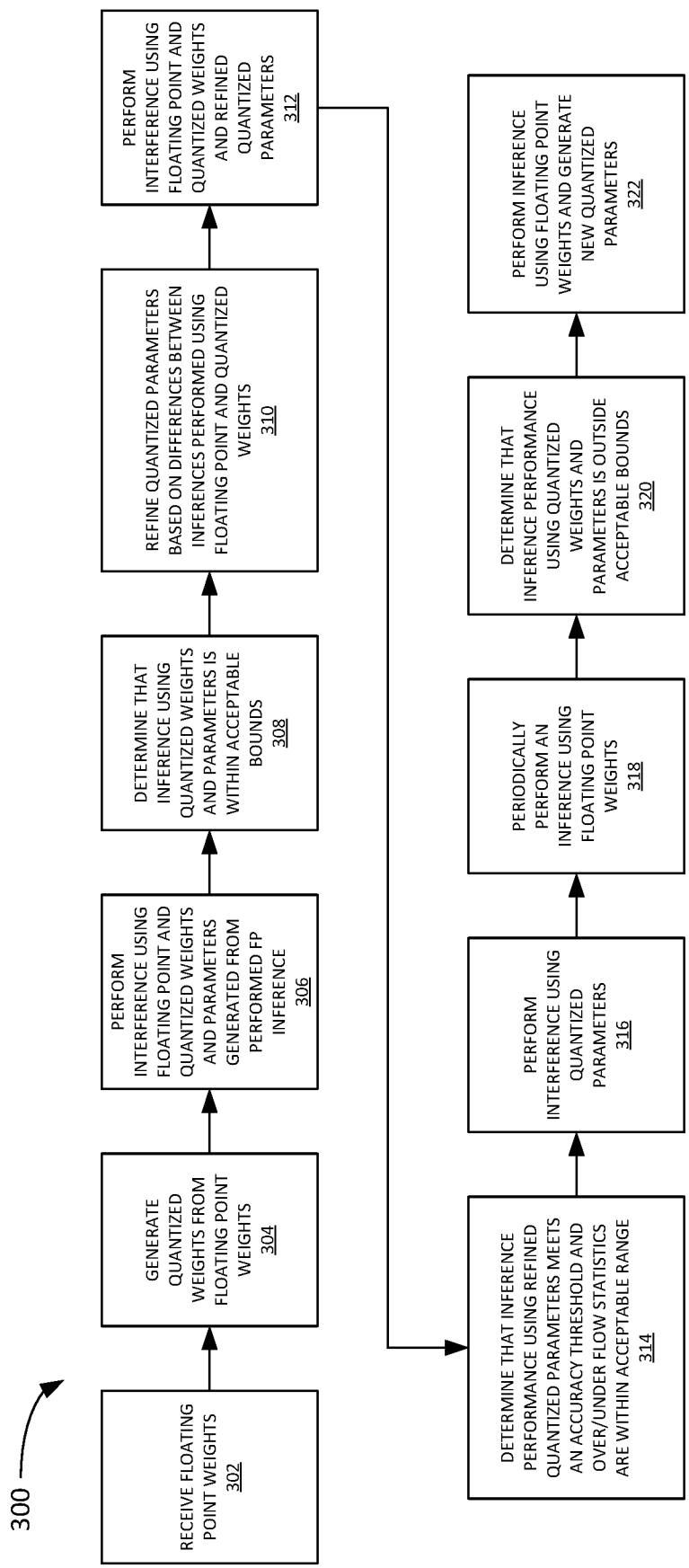
FIG. 3 illustrates a sequence of events for activating and deactivating a high efficiency quantized mode for performing inferences on data, according to embodiments described herein.

FIG. 3 illustrates an example sequence of operations 400 that may be performed to activate and deactivate a high efficiency quantized mode for performing inferences on data.

As illustrated, the operations 300 may begin at block 302, where a system receives floating point weights for a machine learning model to be executed on the system. The floating point weights may be weights previously determined by a model training system and may be used for performing inferences using the machine learning model by executing the machine learning model on high performance processors, such as processors capable of performing operations on large bit-size floating point numbers (e.g., 16-bit half precision floating point, 32-bit single precision floating point, 64-bit double precision floating point, etc.).

At block 304, the system generates quantized weights from the floating point weights. The quantized weights may be generated by reducing the floating point weights into one or more integer approximations of the weights (e.g., 16-bit, 8-bit, 4-bit, etc. integers). As discussed, by reducing floating point weights into integer approximations of the weights, embodiments of the present disclosure may allow for machine learning models to be executed on more power efficient processors that may not be capable of performing floating point operations or may not be capable of performing such operations with acceptable performance.

In some embodiments, the system can generate quantized weights successively from larger to smaller bit-size quantized weights until the accuracy of inferences performed using the quantized weights falls below a threshold accuracy level. In some embodiments, the system can generate quantized weights successively from smaller to larger bit-size quantized weights until the accuracy of inferences performed using the quantized weights reaches or exceeds a threshold accuracy level. In some embodiments, the system can generate a plurality of quantized weight sets and select the quantized weights having optimal performance parameters, such as a smallest number of bits in the integer representation of the quantized weights that results in inference accuracy being at or above a threshold accuracy level and overflow/underflow statistics being under a threshold level.

At block 306, the system performs inferences using floating point weights and quantized weights and quantized parameters generated from the performance of inferences using the floating point weights. The quantized parameters may be, for example, quantized activation statistics generated from ranges of values identified during execution of inferences using the floating point weights.

In some embodiments, the quantized parameters for each layer of the machine learning model may be quantized to a common bit size (e.g., the quantized parameters may be quantized to an n bit representation for every layer in the machine learning model). In some embodiments, the quantized parameters may be quantized to different bit sizes for each layer of the machine learning model such that layers of the machine learning model with smaller dynamic range (e.g., a smaller difference between maximum and minimum values) are quantized to an integer representation using a smaller number of bits, while layers of the machine learning model with larger dynamic range (e.g., a larger difference between maximum and minimum values) are quantized to an integer representation using a larger number of bits. Generally, the performance of inferences using floating point and quantized weights and quantized parameters may be performed in parallel for a number of inferences such that the inference returned in response to a request to perform an inference is the inference generated using the floating point weights until, at block 408, it is determined that inferences performed using one of the sets of quantized weights and parameters provides sufficient accuracy relative to inferences performed using the floating point weights.

At block 308, the system determines that inferences using quantized weights and parameters is within acceptable bounds. The bounds may be determined a priori by a developer of the machine learning model or may be implemented by the system as a threshold accuracy delta between inferences generated using the floating point weights and inferences generated using quantized weights.

At block 310, the system refines the quantized parameters based on differences between inferences performed using the floating point weights and inferences performed using the quantized weights. As discussed, the quantized parameters may be refined based on minimum and maximum values identified in each layer of the machine learning model when the machine learning model is executed using the floating point weights for multiple inferences. By refining quantized parameters over multiple inferences, a more accurate quantization may be performed by accounting for outliers in maximum and minimum values identified during execution of these multiple inferences or by expanding and contracting the range of values based on different inputs that the computing device may perform inferences on. The refined quantized parameters may be refined using a common bit size across a plurality of layers of the machine learning model or may be refined using different bit sizes for each layer of the machine learning model based on the dynamic range of values seen during inference performance using floating point weights in the machine learning model.

At block 312, the system performs subsequent inferences using floating point weights and quantized weights and the refined quantized parameters. The system may repeatedly perform inferences using floating point and quantized weights and refine the quantized parameters until a threshold number of inferences are performed using the quantized weights and quantized parameters. Generally the threshold number of inferences may be a number of inferences having inference accuracy within a threshold accuracy level relative to inferences performed using the floating point weights is reached.

At block 314, the system determines that inference performance using the refined quantized parameters meets an accuracy threshold and that overflow/underflow statistics are within an acceptable range. The overflow/underflow statistics may, for example, be a running counter over a time window of a number of times that a variable in the neural network overflows from a maximum value to a minimum value for a given bit size representation or underflows from a minimum value to a maximum value for the given bit size representation. The overflow/underflow statistics may be calculated globally, for the entirety of the machine learning model, or on a per-layer basis.

At block 316, the system performs inferences using the quantized weights and quantized parameters.

At block 318, the system periodically performs an inference using the floating point weights. The system may be configured to perform inferences using the floating point weights as a check against inferences performed using the quantized weights, and the inferences may be performed for every $m^{th}$ inference request.

At block 320, the system determines that inference performance using the quantized weights and quantized parameters is outside of acceptable bounds. Inference performance being outside of acceptable bounds may include, for example, inference accuracy for an inference performed using the quantized weights and parameters being below a threshold accuracy level relative to inference accuracy for inferences performed using the floating point weights. In some embodiments, inference performance being outside of acceptable bounds may include layer overflow/underflow statistics reaching a threshold number of overflow/underflow instances or affecting a threshold percentage of inferences performed using the quantized weights and quantized parameters. Based on the determination that inference performance using the quantized weights and parameters is outside of acceptable bounds, the system can determine that inferences performed using the quantized weights and parameters are not sufficiently accurate for continued use of the quantized weights and parameters.

At block 322, based on the determination that inference performance using the quantized weights and quantized parameters is outside of acceptable bounds, the system performs inferences using the floating point weights to generate new quantized weights. As discussed above, the system can resume a process of quantizing weights and parameters based on inferences performed using the floating point weights until inference performance using quantized weights and parameters reaches a threshold level of accuracy and an acceptable level of data overflow/underflow within the machine learning model. In some embodiments, the new quantized weights may be generated based on an initial inference performed using the floating point weights, and these new quantized weights may be refined based on subsequent inferences performed using the floating point weights until the new quantized weights are determined to be sufficiently accurate for use in executing future inferences.

Figure 4:
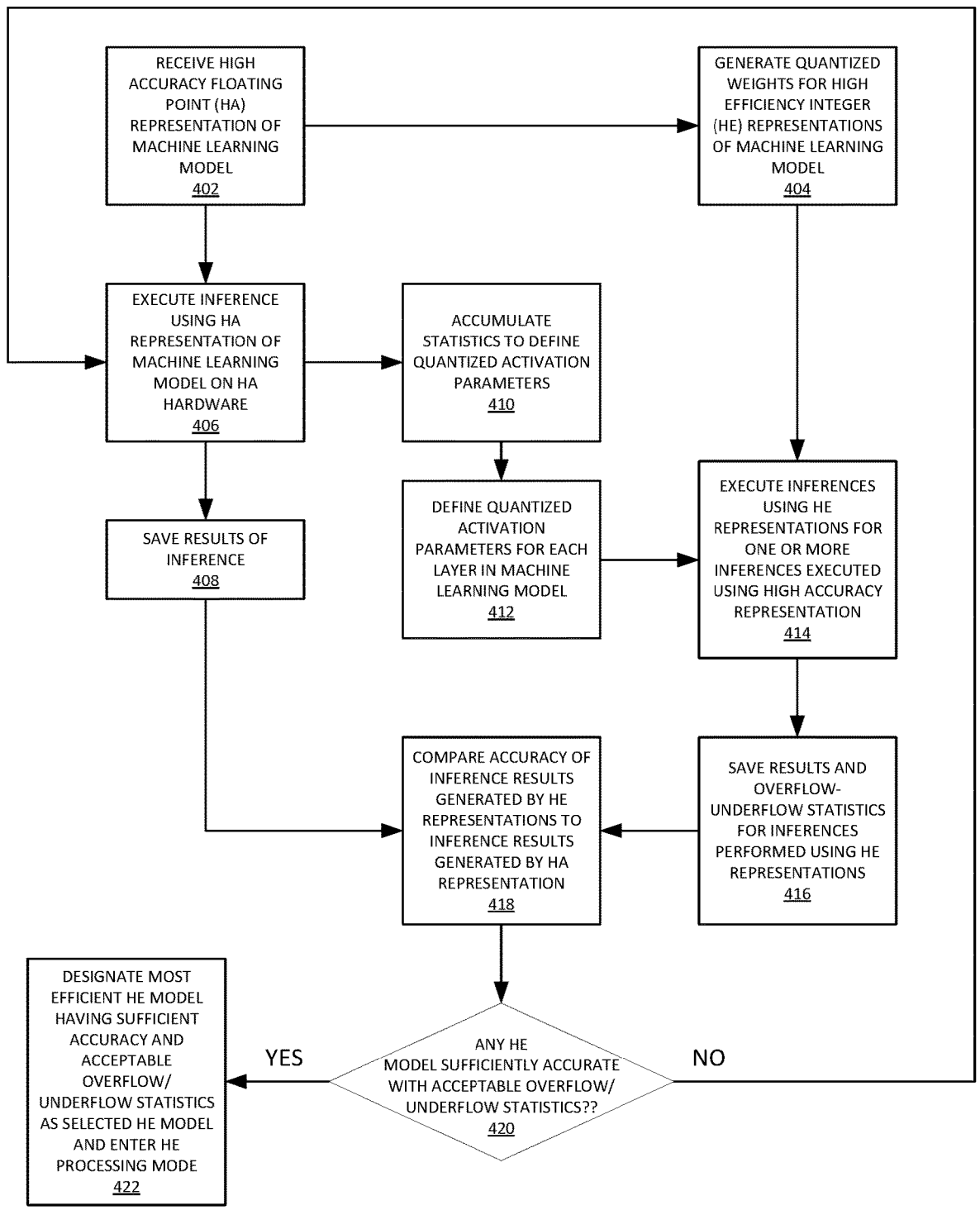
FIG. 4 illustrates a flow chart for switching from a high accuracy mode in which inferences are performed using high-precision floating point parameters to a high efficiency mode in which inferences are performed using lower-precision parameters, according to embodiments described herein.

Example Operations for Switching from a High Accuracy Mode to a High Efficiency Mode for Performing Inferences FIG. 4 illustrates a flow chart for switching from a high accuracy mode in which inferences are performed using high-precision floating point weights to a high efficiency mode in which inferences are performed using lower-precision parameters, according to embodiments described herein.

As illustrated, switching from a high accuracy mode to a high efficiency mode starts at block 402, where a system receives a high accuracy floating point representation of a machine learning model. The high accuracy floating point representation of the machine learning model may be the model generated by a machine learning model trainer and deployed to the system for execution (e.g., included in an application binary, downloaded from a remote computing system, etc.).

At block 404, the system generates quantized weights for one or more high efficiency integer representations of the machine learning model. As discussed, the high efficiency integer representations may be reduced bit-size representations of the high accuracy floating point representation of the machine learning model that trades off some accuracy for efficiency in operation, as inferences performed using the high efficiency integer representations may be executed on more power-efficient processing units than inferences performed using the high accuracy floating point representation.

At block 406, the system executes an inference using the high accuracy representation of the machine learning model on high accuracy hardware. High accuracy hardware may be processors or processing cores that can perform floating point operations, such as cores designated as high performance cores in a heterogeneous multicore processor (e.g. "big" cores in a BIG.little architecture), graphics processing units, tensor processing units, neural processing units, and/or other high performance processing units. At block 408, the system saves the results of performing the inference using the high accuracy representation of the machine learning model for future use. Execution of inferences using the high accuracy representation of the machine learning model and saving the results of the inference performance may repeat until the system switches from a high accuracy model to a high efficiency mode.

In parallel, the system, at block 410, accumulates statistics to define quantized activation parameters for the machine learning model. These statistics may include, for example, maximum and minimum values identified during execution of the machine learning model, and other information that may be used to quantize activation parameters for the machine learning model.

At block 412, the system defines quantized activation parameters for each layer in the machine learning model. The quantized activation parameters may be defined based on the accumulated overflow/underflow statistics and maximum and minimum values for activation parameters identified during execution of the machine learning model. In some embodiments, the quantized activation parameters may be quantized to a common bit size for the layers of the machine learning model or may be quantized to a bit size on a per-layer basis based on the dynamic range of values seen during execution of the machine learning model in each layer of the machine learning model.

At block 414, the system executes inferences using high efficiency representations of the machine learning model for one or more inferences executed using the high accuracy representation of the machine learning model.

At block 416, the system saves the results of the inferences executed using the high efficiency representations of the machine learning model and the quantized activation parameters, as well as overflow and underflow statistics accumulated during execution of the inferences at block 414. The results of the inferences using the high efficiency representations of the machine learning model and the overflow and underflow statistics may be used, as discussed in further detail below, to determine whether the system can switch from inference performance in a high accuracy mode to inference performance in a high efficiency mode.

At block 418, the system compares the accuracy of inference results generated by the high efficiency representations of the machine learning models to the inference results generated by the high accuracy representation of the machine learning model. The system can generate an accuracy measurement or other metric by comparing the result of an inference generated by the high accuracy model, which may be treated as "ground truth" or a most accurate inference, and inferences generated by each of the high efficiency models. In some embodiments, the accuracy metric may be a difference between a value generated by the high accuracy representation of the machine learning model and each of a plurality of high efficiency representations of the machine learning model.

At block 420, the system determines whether any high efficiency model is sufficiently accurate and has acceptable overflow and underflow statistics. A high efficiency model may be deemed to be sufficiently accurate, for example, if inferences generated by the high efficiency model are within a threshold amount of difference away from the corresponding inferences generated by the high accuracy model.

If a model is deemed sufficiently accurate and has acceptable overflow and underflow statistics relative to an a priori defined acceptable number or percentage of overflow and/or underflow events, then at block 422, the system designates the most efficient high efficiency model (e.g., the high efficiency model quantized to the smallest bit size) that is sufficiently accurate and has acceptable overflow and underflow statistics as a selected high efficiency model and enters the high efficiency mode using the selected high efficiency model for the execution of subsequent inferences. The selected high efficiency model may be executed on high efficiency processors that use less power than the high accuracy hardware discussed above. These processors may include, for example, processors designed as high efficiency cores in a heterogeneous multicore processor (e.g., "little" cores in a BIG.little architecture), integer processing modules on a processor, or the like.

If, however, at block 420, the system determines that no high efficiency model is sufficiently accurate and has acceptable overflow and underflow statistics, the system remains in the high accuracy mode, and operations return to block 406, where the system performs a subsequent inference using the high accuracy mode.

Example Operations for Performing Inferences in a High Efficiency Mode

Figure 5:
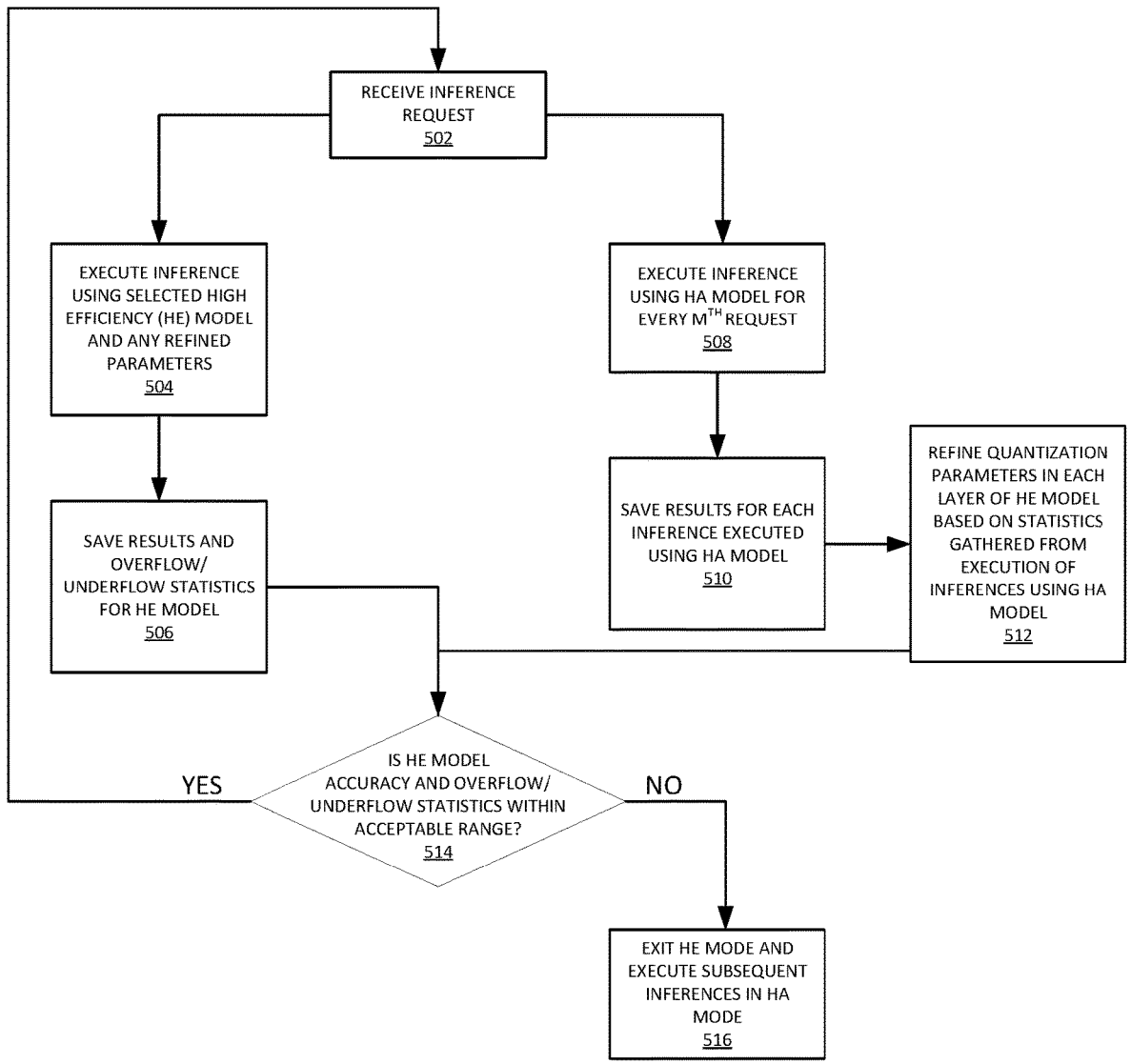
FIG. 5 illustrates a flow chart for executing inferences in a high efficiency mode in which inferences are performed using lower-precision parameters and determining whether to switch to a high accuracy mode, according to embodiments described herein.

FIG. 5 illustrates an example flow chart for executing inferences in a high efficiency (HE) mode in which inferences are performed using lower-precision parameters and determining whether to switch to a high accuracy (HA) mode.

As illustrated, executing inferences in a high efficiency mode begins at block 502, where a system receives an inference request. The inference request generally includes input on which the information is to be performed.

At block 504, the system executes an inference in response to the request. Generally, the executed inference may be performed using a selected high efficiency model (e.g., a machine learning model and weights quantized to a data type that involves less complex computation than a set of weights associated with a high accuracy model). The quantized weights may be weights quantized prior to execution of inferences in the high efficiency mode or refined at block 512, discussed below.

At block 506, the system saves the results of the inference and overflow/underflow statistics for the high efficiency representation of the model.

In parallel, at block 508, the system executes an inference using the high accuracy model for every $m^{th}$ inference request.

At block 510, the system saves the results of each inference executed using the high accuracy model, and at block 512, the system refines quantization parameters for each layer of the high efficiency model based on statistics gathered from execution of inferences using the high accuracy model. As discussed above, the refined quantization parameters may include, for example, refined activation parameters (e.g., per-layer minimum and maximum values) generated based on minimum and maximum values identified in each layer of the machine learning model.

At block 514, the system determines whether the high efficiency model accuracy and overflow/underflow statistics are within an acceptable range. To determine whether high efficiency model accuracy is within an acceptable range, the system compares the inference generated by the high efficiency model for the $m^{th}$ to the inference generated by the high accuracy model for the $m^{th}$ and determines an amount of difference between the inference generated by the high efficiency model and the inference generated by the high accuracy model. If the difference between the inference generated by the high efficiency model and the inference generated by the high accuracy model exceeds a threshold value, the system can determine that the high efficiency model accuracy is outside of an acceptable range.

Overflow/underflow statistics may be accumulated in a counter that identifies a number of times an overflow or underflow situation is experienced during execution of inferences using the high efficiency model. The counter may count overflow and underflow events under a running window of time or may otherwise be periodically reset. If the counter exceeds a threshold value, the system can determine that high efficiency model overflow/underflow statistics are outside of the acceptable range.

If the system determines, at block 514, that high efficiency model accuracy is acceptable and overflow/underflow statistics are within the threshold value, the system may return to block 502 and execute a subsequent inference using the high efficiency model.

Otherwise, at block 516, the system exits the high efficiency mode and executes subsequent inferences using the high accuracy mode (e.g., as discussed above with respect to FIG. 4).

Figure 6:
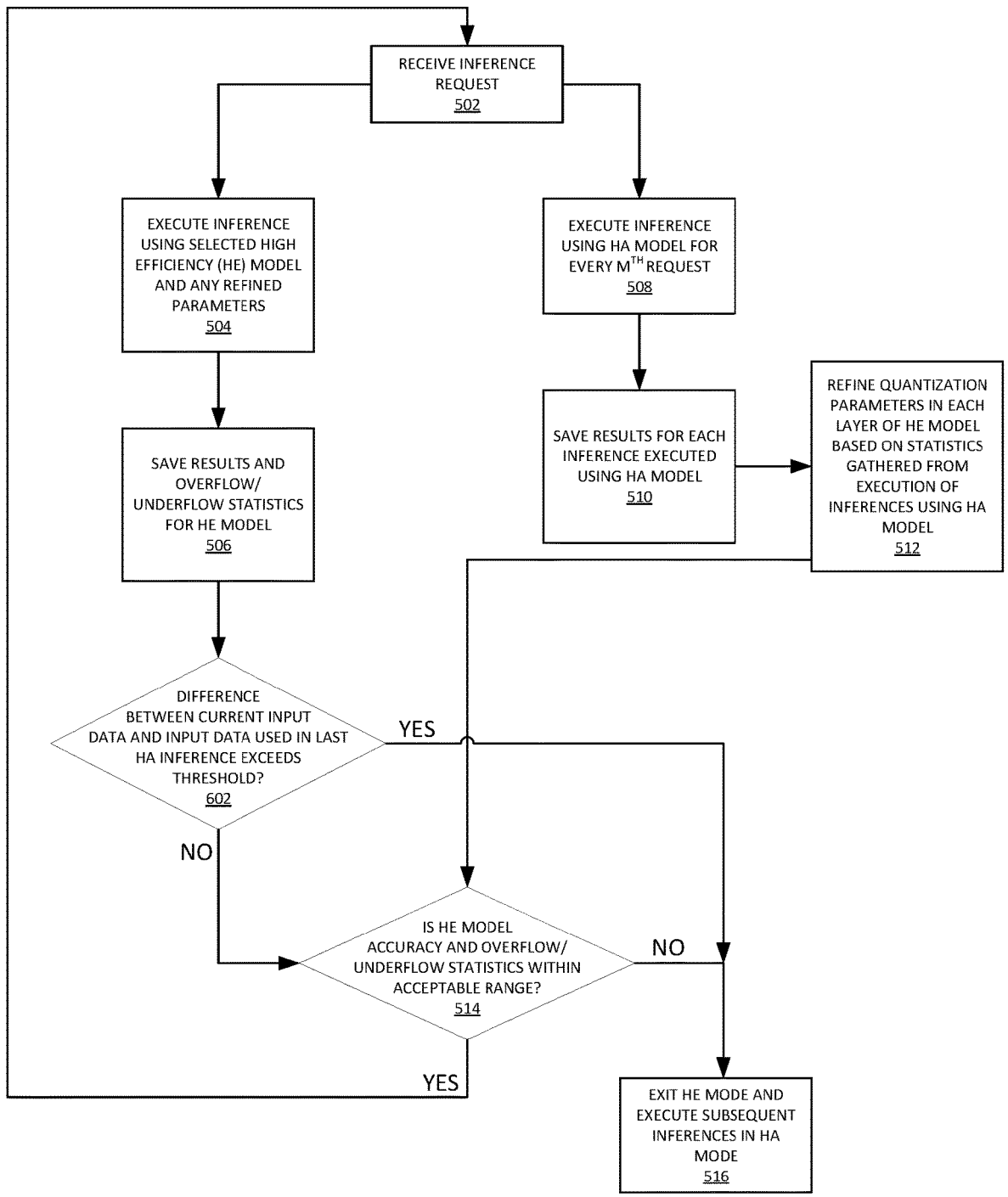
FIG. 6 illustrates a flow chart for executing inferences in a high efficiency mode in which inferences are performed using lower-precision parameters and determining whether to switch to a high accuracy mode based on a difference between a current input and a most recent input for which an inference was generated in a high accuracy mode, according to embodiments described herein.

Example Operations for Performing Inferences in a High Efficiency Mode and Switching to a High Accuracy Mode Based on Differences in Inputs FIG. 6 illustrates an example flow chart for executing inferences in a high efficiency mode in which inferences are performed using lower-precision parameters and determining whether to switch to a high accuracy mode based on a difference between a current input and a most recent input for which an inference was generated in a high accuracy mode.

As illustrated, FIG. 6 adds block 602 to the flow chart illustrated in FIG. 5 such that after an inference is performed using the high efficiency model, a difference between the current input (e.g., the data specified in an inference request received at block 502) and the input used in the most recent execution of an inference in the high accuracy mode is compared. This scenario may exist, for example, when an input data set changes. An input data set may change when inputs into an image recognition system change from one type of image to another type of image. In some embodiments, an input data set may change when a motion vector in an image changes such that a new actor with a new motion vector is added to an image or an existing actor changes a direction of motion. Of course, various other scenarios may exist in which there is a sufficient difference between different inputs such that previously quantized weights and activation parameters are no longer valid. If the difference between the current input and the input used in the most recent execution of an inference in the high accuracy mode exceeds a threshold value, the system can determine that the quantized weights and parameters may no longer be applicable to the data on which inferences are to be performed. Thus, if the difference between the current input and the input used in the most recent execution of an inference in the high accuracy mode exceeds a threshold value, the system can proceed to block 616, where the system exits the high efficiency mode and executes subsequent inferences in the high accuracy mode.

Figure 7:
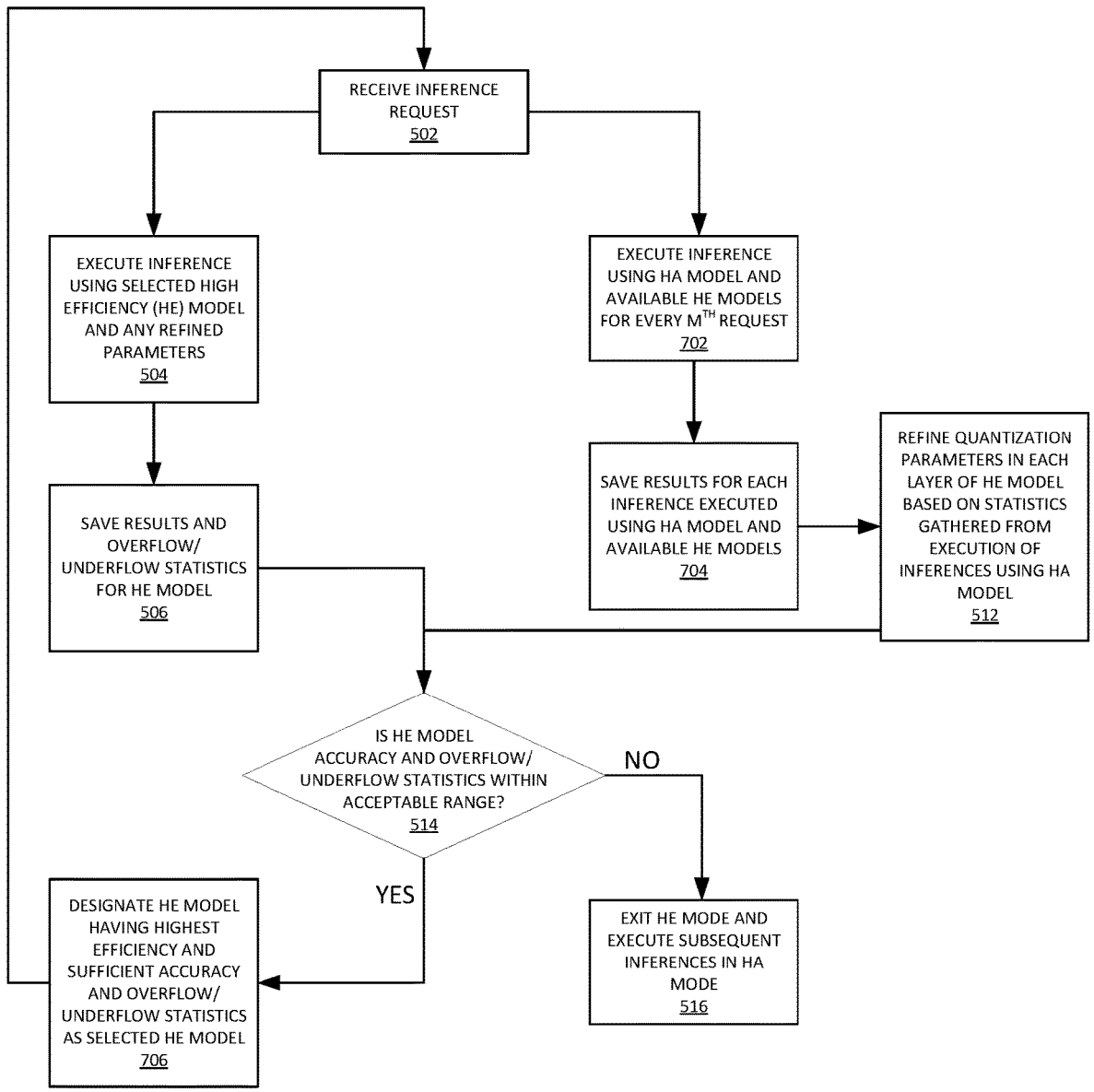
FIG. 7 illustrates a flow chart for executing inferences in a high efficiency mode in which inferences are performed using lower-precision parameters and determining whether to switch to a high accuracy mode or a different high efficiency model, according to embodiments described herein.

Example Operations for Performing Inferences in a High Efficiency Mode Using Multiple High Efficiency Models FIG. 7 illustrates an example flow chart for executing inferences in a high efficiency mode in which inferences are performed using lower-precision parameters and determining whether to switch to a high accuracy mode or a different high efficiency model.

As illustrated, FIG. 7 replaces blocks 508 and 510 with blocks 702 and 704, respectively, and adds block 706 to the flow chart illustrated in FIG. 5. As illustrated, at block 702, for every $m^{th}$ inference request, the system executes an inference using the high accuracy model and each of the available high efficiency models (e.g., the high efficiency models other than the selected high efficiency model that has been designated as the high efficiency model to be used in executing inferences while the system is in the high efficiency mode).

At block 704, the system saves the results of the inferences for the high accuracy model and each of the available high efficiency models.

At block 706, which is executed after the system determines that high efficiency model accuracy and overflow/underflow statistics are within an acceptable range, the system designates the high efficiency model having the highest efficiency and sufficient accuracy and overflow/ underflow statistics as the selected high efficiency model. Generally, the system may select the high efficiency representation of the machine learning model with the smallest bit-size quantization that has sufficient accuracy and overflow/underflow statistics as the selected high efficiency model such that the selected high efficiency model used while the system is in the high efficiency mode is continually the most efficient model. To do so, the system can examine the accuracy and overflow/underflow statistics of the high efficiency models against accuracy and overflow/underflow statistic thresholds. Accuracy may be compared relative to inferences performed using the high accuracy model, and the overflow/underflow statistics may be examined relative to a maximum overflow/underflow count used to determine whether an high efficiency model has a bit size that is sufficient to avoid inaccuracies caused by repeated integer overflow/underflow scenarios.

Figure 8:
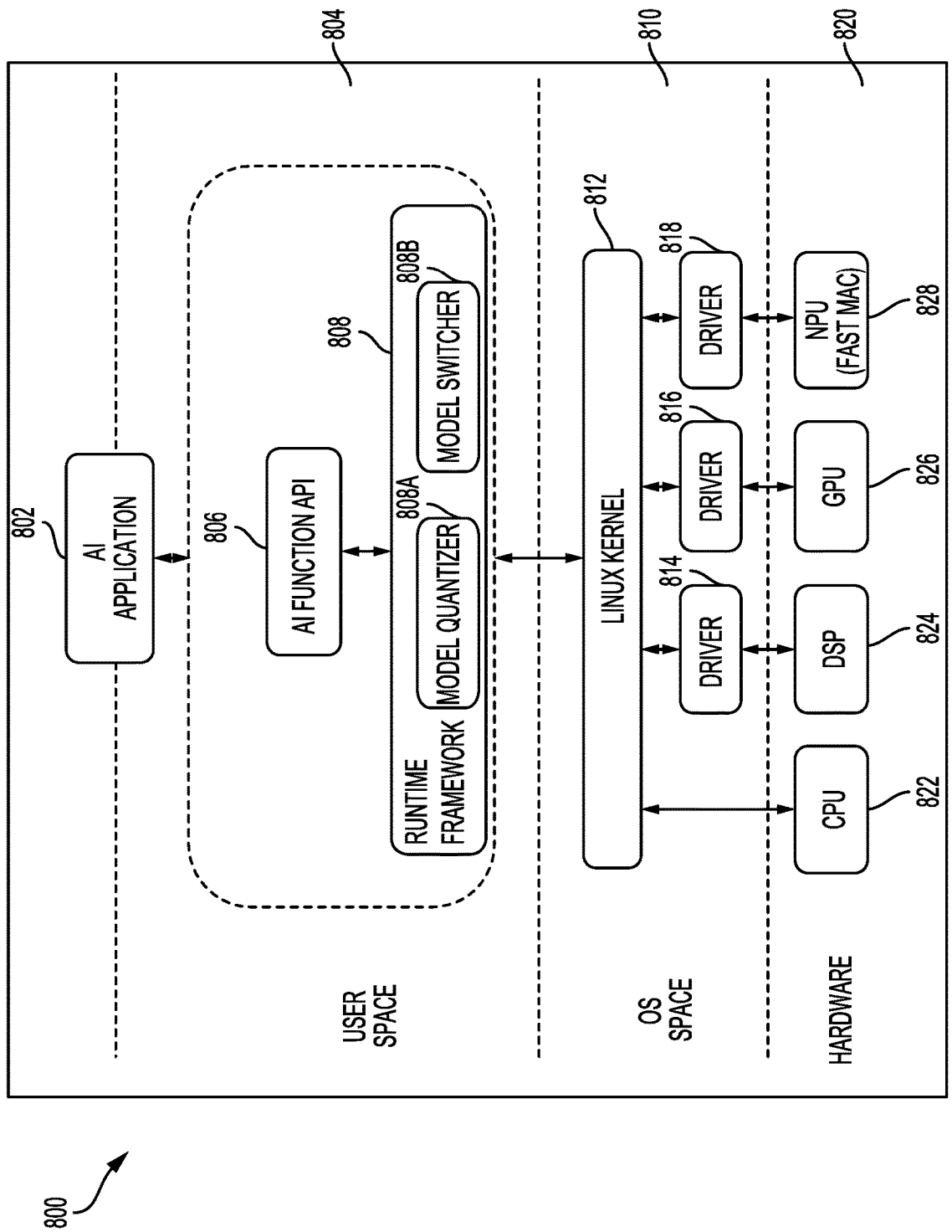
FIG. 8 illustrates an example software architecture for modularizing artificial intelligence (AI) functions, according to embodiments described herein.

Example Software Architecture for Optimizing Machine Learning Model Performance Using High Accuracy and High Efficiency Models FIG. 8 is a block diagram illustrating an exemplary software architecture 800 that may modularize artificial intelligence (AI) functions. Using architecture 800, applications may be designed that may cause various processing blocks of an SOC 820 (for example a CPU 822, a DSP 824, a GPU 826, and/or an NPU 828) to execute inference operations using high accuracy and high efficiency models, according to aspects of the present disclosure.

The AI application 802 may be configured to call functions defined in a user space 804 that may, for example, perform inferences on a given input, as discussed above. The AI application 802 may, for example, configure a microphone and a camera differently depending on whether the recognized scene is an office, a lecture hall, a restaurant, or an outdoor setting such as a lake. The AI application 802 may make a request to compile program code associated with a library defined in an AI function application programming interface (API) 806. This request may ultimately rely on the output of a deep neural network configured to provide an inference response based on video and positioning data, for example.

A run-time engine 808, which may be compiled code of a runtime framework, may be further accessible to the AI application 802. The AI application 802 may cause the run-time engine, for example, to request an inference at a particular time interval or triggered by an event detected by the user interface of the application. As illustrated, run-time engine 808 may include a model quantizer 808A and a model switcher 808B. Model quantizer 808A generally uses the floating point weights defined a priori for a given machine learning model deployed within architecture 800 to generate one or more quantized sets of weights having a reduced bit size and complexity relative to the floating point weights. Model switcher 808B is generally configured to perform inferences using the floating point weights and one or more of the quantized sets of weights to generate quantized activation parameters for the machine learning model and determine whether to perform subsequent inferences using the floating point weights or the quantized weights.

When caused to provide an inference response, the run-time engine may in turn send a signal to an operating system in an operating system (OS) space 810, such as a Linux Kernel 812, running on the SOC 820. The operating system, in turn, may cause inferences to be performed on the CPU 822, the DSP 824, the GPU 826, the NPU 828, or some combination thereof. The CPU 822 may be accessed directly by the operating system, and other processing blocks may be accessed through a driver, such as a driver 814, 816, or 818 for, respectively, the DSP 824, the GPU 826, or the NPU 828. In the exemplary example, the deep neural network may be configured to run on a combination of processing blocks, such as the CPU 822, the DSP 824, and the GPU 826, or may be run on the NPU 828.

Additional Considerations

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s)

and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

FURTHER EXAMPLES

Further examples of the present invention are explained in the following paragraphs:

Example 1

A method for adaptively executing machine learning models on a computing device, comprising: receiving weight information for a machine learning model to be executed on a computing device; reducing the received weight information into quantized weight information having a reduced bit size relative to the received weight information; performing first inferences using the machine learning model and the received weight information; performing second inferences using the machine learning model and the quantized weight information; comparing results of the first and second inferences; determining that results of the second inferences are within a threshold performance level of results of the first inferences; and based on determining that results of the second inferences are within a threshold performance level of results of the first inferences, performing one or more subsequent inferences using the machine learning model and the quantized weight information.

Example 2

The method of Example 1, wherein: the received weight information comprises a floating point representation of weights in the machine learning model; and the quantized weight information comprises an integer approximation of the floating point representation of the weights in the machine learning model.

Example 3

The method of any of Examples 1 or 2, wherein the quantized weight information comprises a plurality of weight sets, each weight set having a different bit size.

Example 4

The method of Example 3, wherein: performing the second inference comprises performing an inference using the machine learning model and each of the plurality of sets, and determining that results of the second inference are within the threshold performance level of results of the first inference comprises: identifying a weight set of the plurality of weight sets with a result having a performance closest to the threshold performance level, and returning the result associated with the identified weight set as the result of the second inference.

Example 5

The method of Example 4, wherein performing the one or more subsequent inferences using the machine learning model and the quantized weight information comprises performing the one or more subsequent inferences using the identified weight set of the plurality of weight sets.

Example 6

The method of any of Examples 1 to 5, wherein the quantized weight information comprises first quantized weights having a predefined bit size.

Example 7

The method of Example 6, further comprising: generating second quantized weights having a smaller bit size than the quantized weight information; performing a subset of the one or more subsequent inferences using the second quantized weights; determining that results of the subset of the one or more subsequent inferences using the second quantized weights are within the threshold performance level of results of the subset of the one or more subsequent inferences using the machine learning model and the quantized weight information; and based on the determining, performing additional inferences beyond the one or more subsequent inferences using the machine learning model and the second quantized weights.

Example 8

The method of Example 6, further comprising: while performing the second inference using the machine learning model and the first quantized weights, generating second quantized weights from quantizing the received weight information, the second quantized weights having a larger bit size than the first quantized weights; determining that results of the second inference using the machine learning model and the quantized weight information are not within the threshold performance level of the results of the first inference for a threshold number of inferences; and performing additional inferences using the second quantized weights.

Example 9

The method of any of Examples 1 to 8, wherein the performance level comprises an accuracy difference relative to the first inference and a size of overflow or underflow relative to supported range of values for each layer in the machine learning model, given a bit size of the quantized weight information.

Example 10

The method of any of Examples 1 to 9, further comprising: adjusting the threshold performance level based on an amount of difference between a current input and a previous input for which inferences are to be performed using the machine learning model.

Example 11

The method of any of Examples 1 to 10, further comprising: determining that a difference between a current input and a previous input for which inferences are to be performed using the machine learning model exceeds a threshold amount of change; and performing inferences on the current input and one or more additional inferences using the machine learning model and the received weight information.

Example 12

The method of any of Examples 1 to 11, further comprising: performing inferences for a subset of the one or more subsequent inferences using the machine learning model and the received weight information; determining that results of the subset of the one or more subsequent inferences using the machine learning model and the quantized weight information are outside the threshold performance level relative to results of the subset of the one or more subsequent inferences using the machine learning model and the received weight information; and based on the determining, performing additional inferences using the machine learning model and the received weight information.

Example 13

The method of any of Examples 1 to 12, further comprising: refining the quantized weight information based on results of the one or more subsequent inferences executed using the machine learning model and the quantized weight information, the refined quantized weight information comprising ranges of values to use in performing inferences using the machine learning model and the refined quantized weight information.

Example 14

The method of any of Examples 1 to 13, wherein each inference of the second inferences is performed according to a periodicity defining a number of first inferences to be performed prior to performing one of the second inferences.

Example 15

The method of any of Examples 1 to 14, wherein a subset of the one or more subsequent inferences are also performed using the received weight information.

Example 16

The method of Example 15, wherein: the subset of the one or more subsequent inferences comprises a periodic sampling of the one or more subsequent inferences, and a periodicity of the periodic sampling is determined from a performance difference between results of the subset of the one or more subsequent inferences performed using the received weight information and results of the subset of the one or more subsequent inferences performed using the quantized weight information.

Example 17

The method of any of Examples 1 to 16, further comprising: saving the quantized weight information prior to halting performance of inferences using the machine learning model; and resuming performance of inferences using the machine learning model and the quantized weight information without regenerating the quantized weight information.

Example 18

The method of any of Examples 1 to 17, wherein: the quantized weight information comprises individual quantized weights for each layer in the machine learning model, and quantized weights for a respective layer in the machine learning model has a bit size independent of a bit size of quantized weights for other layers in the machine learning model.

Example 19

The method of any of Examples 1 to 18, further comprising: performing inferences using the received weight information on a first set of processing cores in a multicore processor, and performing inferences using the quantized weight information on a second set of cores in the multicore processor.

Example 20

The method of any of Examples 1 to 19, wherein the first inferences and second inferences are performed in parallel across different processing cores in a multicore processor.

Example 21

The method of any of Examples 1 to 20, wherein: the first inferences are performed on a first type of processor; and the second inferences are performed on a second type of processor.

Example 22

The method of any of Examples 1 to 21, wherein: the first inferences are performed on a first set of processing cores in a heterogeneous multicore processor; and the second inferences are performed on a second set of processing cores in the heterogeneous multicore processor.

Example 23

A system, comprising: a processor; and a memory having instructions stored thereon which, when executed by the processor, performs an operation for adaptively executing machine learning machine learning models on a computing device, the operation comprising: receiving weight information for a machine learning model to be executed on a computing device; reducing the received weight information into quantized weight information having a reduced bit size relative to the received weight information; performing first inferences using the machine learning model and the received weight information; performing second inferences using the machine learning model and the quantized weight information; comparing results of the first and second inferences; determining that results of the second inferences are within a threshold performance level of results of the first inferences; and based on determining that results of the second inferences are within a threshold performance level of results of the first inferences, performing one or more subsequent inferences using the machine learning model and the quantized weight information.

Example 24

The system of example 23, wherein: the received weight information comprises a floating point representation of weights in the machine learning model; and the quantized weight information comprises an integer approximation of the floating point representation of the weights in the machine learning model.

Example 25

The system of any of Examples 23 or 24, wherein the quantized weight information comprises a plurality of weight sets, each weight set having a different bit size.

Example 26

The system of Example 25, wherein: performing the second inference comprises performing an inference using the machine learning model and each of the plurality of weight sets, and determining that results of the second inference are within the threshold performance level of results of the first inference comprises: identifying a weight set of the plurality of weight sets with a result having a performance closest to the threshold performance level, and returning the result associated with the identified weight set as the result of the second inference.

Example 27

The system of Example 26, wherein performing the one or more subsequent inferences using the machine learning model and the quantized weight information comprises performing the one or more subsequent inferences using the identified weight set of the plurality of weight sets.

Example 28

The system of any of Examples 23 to 27, wherein the quantized weight information comprises first quantized weights having a predefined bit size.

Example 29

The system of Example 28, further comprising: generating second quantized weights having a smaller bit size than the quantized weight information; performing a subset of the one or more subsequent inferences using the second quantized weights; determining that results of the subset of the one or more subsequent inferences using the second quantized weights are within the threshold performance level of results of the subset of the one or more subsequent inferences using the machine learning model and the quantized weights; and based on the determining, performing additional inferences beyond the one or more subsequent inferences using the machine learning model and the second quantized weight information.

Example 30

The system of Example 28, wherein the operation further comprises: while performing the second inference using the machine learning model and the first quantized weights, generating second quantized weights from quantizing the received weight information, the second quantized weights having a larger bit size than the first quantized weights; determining that results of the second inference using the machine learning model and the quantized weight information are not within the threshold performance level of the results of the first inference for a threshold number of inferences; and performing additional inferences using the second quantized weights.

Example 31

The system of any of Examples 23 to 30, wherein the performance level comprises an accuracy difference relative to the first inference and a size of overflow or underflow relative to supported range of values for each layer in the machine learning model, given a bit size of the quantized weight information.

Example 32

The system of any of Examples 23 to 31, further comprising: adjusting the threshold performance level based on an amount of difference between a current input and a previous input for which inferences are to be performed using the machine learning model.

Example 33

The system of any of Examples 23 to 32, further comprising: determining that a difference between a current input and a previous input for which inferences are to be performed using the machine learning model exceeds a threshold amount of change; and performing inferences on the current input and one or more additional inferences using the machine learning model and the received weight information.

Example 34

The system of any of Examples 23 to 33, wherein the operation further comprises: performing inferences for a subset of the one or more subsequent inferences using the machine learning model and the received weight information; determining that results of the subset of the one or more subsequent inferences using the machine learning model and the quantized weight information are outside the threshold performance level relative to results of the subset of the one or more subsequent inferences using the machine learning model and the received weight information; and based on the determining, performing additional inferences using the machine learning model and the received weight information.

Example 35

The system of any of Examples 23 to 34, wherein the operation further comprises: refining the quantized weight information based on results of the one or more subsequent inferences executed using the machine learning model and the quantized weight information, the refined quantized weight information comprising ranges of values to use in performing inferences using the machine learning model and the refined quantized weight information.

Example 36

The system of any of Examples 23 to 35, wherein each inference of the second inferences is performed according to a periodicity defining a number of first inferences to be performed prior to performing one of the second inferences.

Example 37

The system of any of Examples 23 to 36, wherein a subset of the one or more subsequent inferences are also performed using the received weight information.

Example 38

The system of Example 37, wherein: the subset of the one or more subsequent inferences comprises a periodic sampling of the one or more subsequent inferences, and a periodicity of the periodic sampling is determined from a performance difference between results of the subset of the one or more subsequent inferences performed using the received weight information and results of the subset of the one or more subsequent inferences performed using the quantized weight information.

Example 39

The system of any of Examples 23 to 38, wherein the operation further comprises: saving the quantized weight information prior to halting performance of inferences using the machine learning model; and resuming performance of inferences using the machine learning model and the quantized weight information without regenerating the quantized weight information.

Example 40

The system of any of Examples 23 to 39, wherein: the quantized weight information comprises individual quantized weights for each layer in the machine learning model, and quantized weights for a respective layer in the machine learning model has a bit size independent of a bit size of quantized weights for other layers in the machine learning model.

Example 41

The system of any of Examples 23 to 40, wherein the operation further comprises: performing inferences using the received weight information on a first set of processing cores in a multicore processor, and performing inferences using the quantized weight information on a second set of cores in the multicore processor.

Example 42

The system of any of Examples 23 to 41, wherein the first inferences and second inferences are performed in parallel across different processing cores in a multicore processor.

Example 43

The system of any of Examples 23 to 42, wherein: the first inferences are performed on a first type of processor; and the second inferences are performed on a second type of processor.

Example 44

The system of any of Examples 23 to 43, wherein: the first inferences are performed on a first set of processing cores in a heterogeneous multicore processor; and the second inferences are performed on a second set of processing cores in the heterogeneous multicore processor.

Example 45

A system for adaptively executing machine learning machine learning models on a computing device, comprising: means for receiving weight information for a machine learning model to be executed on a computing device; means for reducing the received weight information into quantized weight information having a reduced bit size relative to the received weight information; means for performing first inferences using the machine learning model and the received weight information; means for performing second inferences using the machine learning model and the quantized weight information; means for comparing results of the first and second inferences; means for determining that results of the second inferences are within a threshold performance level of results of the first inferences; and means for based on determining that results of the second inferences are within a threshold performance level of results of the first inferences, performing one or more subsequent inferences using the machine learning model and the quantized weight information.

Example 46

A computer-readable medium having instructions stored thereon which, when executed, performs an operation for adaptively executing machine learning machine learning models on a computing device, comprising: receiving weight information for a machine learning model to be executed on a computing device; reducing the received weight information into quantized weight information having a reduced bit size relative to the received weight information; performing first inferences using the machine learning model and the received weight information; performing second inferences using the machine learning model and the quantized weight information; comparing results of the first and second inferences; determining that results of the second inferences are within a threshold performance level of results of the first inferences; and based on determining that results of the second inferences are within a threshold performance level of results of the first inferences, performing one or more subsequent inferences using the machine learning model and the quantized weight information.

Example 47

A computer program comprising instructions for performing a method according to any of the Examples 1 to 22.

What is claimed is:
1. A method for adaptively executing machine learning models on a computing device, comprising:
  receiving weight information for a machine learning model to be executed on the computing device;
  reducing the received weight information into quantized weight information having a reduced bit size relative to the received weight information, wherein the quantized weight information comprises a plurality of weight sets, each respective weight set quantizing the weight information for the machine learning model into a respective bit size;
  performing first inferences using the machine learning model and the received weight information;

performing second inferences using the machine learning model and the quantized weight information;

comparing results of the first and second inferences;

determining that results of the second inferences are within a threshold performance level of results of the first inferences;

based on determining that the results of the second inferences are within the threshold performance level of the results of the first inferences, performing one or more subsequent inferences using the machine learning model and the quantized weight information;

performing inferences for a subset of the one or more subsequent inferences using the machine learning model and the received weight information;

determining that results of the subset of the one or more subsequent inferences using the machine learning model and the quantized weight information are outside the threshold performance level relative to results of a subset of the one or more subsequent inferences performed using the machine learning model and the received weight information; and based on determining that the results of the subset of the one or more subsequent inferences using the machine learning model and the quantized weight information are outside the threshold performance level relative to the results of the subset of the one or more subsequent inferences performed using the machine learning model and the quantized weight information, performing additional inferences using the machine learning model and the received weight information.

2. The method of claim 1, wherein:

the received weight information comprises a floating point representation of weights in the machine learning model; and the quantized weight information comprises an integer approximation of the floating point representation of the weights in the machine learning model.

3. The method of claim 1, wherein:

performing the second inferences comprises performing an inference using the machine learning model and each of the plurality of weight sets, and determining that the results of the second inferences are within the threshold performance level of the results of the first inferences comprises:

identifying a weight set of the plurality of weight sets with a result having a performance closest to the threshold performance level, and returning the result associated with the identified weight set as the results of the second inferences.

4. The method of claim 3, wherein performing the one or more subsequent inferences using the machine learning model and the quantized weight information comprises performing the one or more subsequent inferences using the identified weight set of the plurality of weight sets.

5. The method of claim 1, wherein the quantized weight information comprises first quantized weights having a predefined bit size.

6. The method of claim 5, further comprising:

generating second quantized weights having a smaller bit size than the quantized weight information;

performing a subset of the one or more subsequent inferences using the second quantized weights;

determining that results of the subset of the one or more subsequent inferences using the second quantized weights are within the threshold performance level of results of a subset of the one or more subsequent inferences performed using the machine learning model and the quantized weight information; and based on determining that the results of the subset of the one or more subsequent inferences using the second quantized weights are within the threshold performance level of the results of the subset of the one or more subsequent inferences performed using the machine learning model and the quantized weight information, performing additional inferences beyond the one or more subsequent inferences using the machine learning model and the second quantized weights.

7. The method of claim 5, further comprising:

while performing the second inferences using the machine learning model and the first quantized weights, generating second quantized weights from quantizing the received weight information, the second quantized weights having a larger bit size than the first quantized weights;

determining that results of the second inferences using the machine learning model and the quantized weight information are not within the threshold performance level of the results of the first inferences for at least a threshold number of inferences; and performing additional inferences using the second quantized weights.

8. The method of claim 1, wherein the threshold performance level comprises an accuracy difference relative to the first inferences and a size of overflow or underflow relative to a supported range of values for each layer in the machine learning model, given the bit size of the quantized weight information.

9. The method of claim 1, further comprising: adjusting the threshold performance level based on an amount of difference between a current input and a previous input for which inferences are to be performed using the machine learning model.

10. The method of claim 1, further comprising:

determining that a difference between a current input and a previous input for which inferences are to be performed using the machine learning model exceeds a threshold amount of change; and performing inferences on the current input and one or more additional inferences using the machine learning model and the received weight information.

11. The method of claim 1, further comprising: refining the quantized weight information based on results of the one or more subsequent inferences executed using the machine learning model and the quantized weight information, the refined quantized weight information comprising ranges of values to use in performing inferences using the machine learning model and the refined quantized weight information.

12. The method of claim 1, wherein each inference of the second inferences is performed according to a periodicity defining a number of the first inferences to be performed prior to performing one of the second inferences.

13. The method of claim 1, wherein a subset of the one or more subsequent inferences are also performed using the received weight information.

14. The method of claim 13, wherein:

the subset of the one or more subsequent inferences comprises a periodic sampling of the one or more subsequent inferences, and a periodicity of the periodic sampling is determined from a performance difference between results of the subset of the one or more subsequent inferences performed using the received weight information and results of the subset of the one or more subsequent inferences performed using the quantized weight information.

15. The method of claim 1, further comprising:
saving the quantized weight information prior to halting performance of inferences using the machine learning model; and
resuming performance of inferences using the machine learning model and the quantized weight information without regenerating the quantized weight information.

16. The method of claim 1, wherein:
the quantized weight information comprises individual quantized weights for each layer in the machine learning model, and
quantized weights for a respective layer in the machine learning model have a bit size independent of a bit size of quantized weights for other layers in the machine learning model.

17. The method of claim 1, further comprising:
performing inferences using the received weight information on a first set of processing cores in a multicore processor, and
performing inferences using the quantized weight information on a second set of processing cores in the multicore processor.

18. The method of claim 1, wherein the first inferences and second inferences are performed in parallel across different processing cores in a multicore processor.

19. The method of claim 1, wherein:
the first inferences are performed on a first type of processor; and
the second inferences are performed on a second type of processor.

20. The method of claim 1, wherein:
the first inferences are performed on a first set of processing cores in a heterogeneous multicore processor; and
the second inferences are performed on a second set of processing cores in the heterogeneous multicore processor.

21. A system, comprising:
a processor; and
a memory having instructions stored thereon which, when executed by the processor, perform an operation for adaptively executing machine learning models on a computing device, the operation comprising:
receiving weight information for a model to be executed on the computing device;
reducing the received weight information into quantized weight information having a reduced bit size relative to the received weight information, wherein the quantized weight information comprises a plurality of weight sets, each respective weight set quantizing the weight information for the machine learning model into a respective bit size;
performing first inferences using the machine learning model and the received weight information;
performing second inferences using the machine learning model and the quantized weight information;
comparing results of the first and second inferences;
determining that results of the second inferences are within a threshold performance level of results of the first inferences;
based on determining that the results of the second inferences are within the threshold performance level of the results of the first inferences, performing one or more subsequent inferences using the machine learning model and the quantized weight information;
performing inferences for a subset of the one or more subsequent inferences using the machine learning model and the received weight information;
determining that results of the subset of the one or more subsequent inferences using the machine learning model and the quantized weight information are outside the threshold performance level relative to results of a subset of the one or more subsequent inferences performed using the machine learning model and the received weight information; and
based on determining that the results of the subset of the one or more subsequent inferences using the machine learning model and the quantized weight information are outside the threshold performance level relative to the results of the subset of the one or more subsequent inferences performed using the machine learning model and the received weight information, performing additional inferences using the machine learning model and the received weight information.

22. The system of claim 21, wherein:
the received weight information comprises a floating point representation of weights in the machine learning model; and
the quantized weight information comprises an integer approximation of the floating point representation of the weights in the machine learning model.

23. The system of claim 21, wherein:
performing the second inferences comprises performing an inference using the machine learning model and each of the plurality of weight sets, and
determining that the results of the second inferences are within the threshold performance level of the results of the first inferences comprises:
identifying a weight set of the plurality of weight sets with a result having a performance closest to the threshold performance level, and
returning the result associated with the identified weight set as the results of the second inferences.

24. The system of claim 23, wherein performing the one or more subsequent inferences using the machine learning model and the quantized weight information comprises performing the one or more subsequent inferences using the identified weight set of the plurality of weight sets.

25. The system of claim 21, wherein the quantized weight information comprises first quantized weights having a predefined bit size.

26. The system of claim 25, further comprising:
generating second quantized weights having a smaller bit size than the quantized weight information;
performing a subset of the one or more subsequent inferences using the second quantized weights;
determining that results of the subset of the one or more subsequent inferences using the second quantized weights are within the threshold performance level of results of a subset of the one or more subsequent inferences performed using the machine learning model and the quantized weight information; and
based on determining that the results of the subset of the one or more subsequent inferences using the second quantized weights are within the threshold performance level of the results of the subset of the one or more subsequent inferences performed using the machine learning model and the quantized weight information, performing additional inferences beyond the one or more subsequent inferences using the machine learning model and the second quantized weights.

27. The system of claim 25, wherein the operation further comprises:
while performing the second inferences using the machine learning model and the first quantized weights, generating second quantized weights from quantizing the received weight information, the second quantized weights having a larger bit size than the first quantized weights;
determining that results of the second inferences using the machine learning model and the quantized weight information are not within the threshold performance level of the results of the first inferences for at least a threshold number of inferences; and
performing additional inferences using the second quantized weights.

28. The system of claim 21, wherein the threshold performance level comprises an accuracy difference relative to the first inferences and a size of overflow or underflow relative to a supported range of values for each layer in the machine learning model, given the bit size of the quantized weight information.

29. The system of claim 21, further comprising: adjusting the threshold performance level based on an amount of difference between a current input and a previous input for which inferences are to be performed using the machine learning model.

30. The system of claim 21, further comprising:
determining that a difference between a current input and a previous input for which inferences are to be performed using the machine learning model exceeds a threshold amount of change; and
performing inferences on the current input and one or more additional inferences using the machine learning model and the received weight information.

31. The system of claim 21, wherein the operation further comprises: refining the quantized weight information based on results of the one or more subsequent inferences executed using the machine learning model and the quantized weight information, the refined quantized weight information comprising ranges of values to use in performing inferences using the machine learning model and the refined quantized weight information.

32. The system of claim 21, wherein each inference of the second inferences is performed according to a periodicity defining a number of the first inferences to be performed prior to performing one of the second inferences.

33. The system of claim 21, wherein a subset of the one or more subsequent inferences are also performed using the received weight information.

34. The system of claim 33, wherein:
the subset of the one or more subsequent inferences comprises a periodic sampling of the one or more subsequent inferences, and
a periodicity of the periodic sampling is determined from a performance difference between results of the subset of the one or more subsequent inferences performed using the received weight information and results of the subset of the one or more subsequent inferences performed using the quantized weight information.

35. The system of claim 21, wherein the operation further comprises:
saving the quantized weight information prior to halting performance of inferences using the machine learning model; and
resuming performance of inferences using the machine learning model and the quantized weight information without regenerating the quantized weight information.

36. The system of claim 21, wherein:
the quantized weight information comprises individual quantized weights for each layer in the machine learning model, and
quantized weights for a respective layer in the machine learning model have a bit size independent of a bit size of quantized weights for other layers in the machine learning model.

37. The system of claim 21, wherein the processor comprises a multicore processor and wherein the operation further comprises:
performing inferences using the received weight information on a first set of processing cores in the multicore processor, and
performing inferences using the quantized weight information on a second set of processing cores in the multicore processor.

38. The system of claim 21, wherein the first inferences and second inferences are performed in parallel across different processing cores of the processor.

39. The system of claim 21, wherein:
the processor comprises a first type of processor;
the first inferences are performed on the first type of processor; and
the second inferences are performed on a second type of processor.

40. The system of claim 21, wherein:
the processor comprises a heterogeneous multicore processor;
the first inferences are performed on a first set of processing cores in the heterogeneous multicore processor; and
the second inferences are performed on a second set of processing cores in the heterogeneous multicore processor.

41. A system for adaptively executing machine learning models on a computing device, comprising:
means for receiving weight information for a machine learning model to be executed on the computing device;
means for reducing the received weight information into quantized weight information having a reduced bit size relative to the received weight information, wherein the quantized weight information comprises a plurality of weight sets, each respective weight set quantizing the weight information for the machine learning model into a respective bit size;
means for performing first inferences using the machine learning model and the received weight information;
means for performing second inferences using the machine learning model and the quantized weight information;
means for comparing results of the first and second inferences;
means for determining that results of the second inferences are within a threshold performance level of results of the first inferences;
means for performing one or more subsequent inferences, based on determining that the results of the second inferences are within the threshold performance level of the results of the first inferences, using the machine learning model and the quantized weight information;

means for performing inferences for a subset of the one or more subsequent inferences using the machine learning model and the received weight information;

means for determining that results of the subset of the one or more subsequent inferences using the machine learning model and the quantized weight information are outside the threshold performance level relative to results of a subset of the one or more subsequent inferences performed using the machine learning model and the received weight information; and based on means for determining that the results of the subset of the one or more subsequent inferences using the machine learning model and the quantized weight information are outside the threshold performance level relative to the results of the subset of the one or more subsequent inferences performed using the machine learning model and the quantized weight information, means for performing additional inferences using the machine learning model and the received weight information.

42. A non-transitory computer-readable medium having instructions stored thereon which, when executed, perform an operation for adaptively executing machine learning models on a computing device, the operation comprising:

receiving weight information for a machine learning model to be executed on the computing device;

reducing the received weight information into quantized weight information having a reduced bit size relative to the received weight information, wherein the quantized weight information comprises a plurality of weight sets, each respective weight set quantizing the weight information for the machine learning model into a respective bit size;

performing first inferences using the machine learning model and the received weight information;

performing second inferences using the machine learning model and the quantized weight information;

comparing results of the first and second inferences;

determining that results of the second inferences are within a threshold performance level of results of the first inferences;

based on determining that the results of the second inferences are within the threshold performance level of the results of the first inferences, performing one or more subsequent inferences using the machine learning model and the quantized weight information;

performing inferences for a subset of the one or more subsequent inferences using the machine learning model and the received weight information;

determining that results of the subset of the one or more subsequent inferences using the machine learning model and the quantized weight information are outside the threshold performance level relative to results of a subset of the one or more subsequent inferences performed using the machine learning model and the received weight information; and based on determining that the results of the subset of the one or more subsequent inferences using the machine learning model and the quantized weight information are outside the threshold performance level relative to the results of the subset of the one or more subsequent inferences performed using the machine learning model and the quantized weight information, performing additional inferences using the machine learning model and the received weight information.

* * * * *